US012394150B1

(12) United States Patent
Flowers et al.

(10) Patent No.: US 12,394,150 B1
(45) Date of Patent: Aug. 19, 2025

(54) SYSTEMS AND METHODS FOR ENVIRONMENT MAPPING BY AERIAL VEHICLES LEVERAGING ONBOARD LIGHT SOURCES

(71) Applicant: Amazon Technologies, Inc., Seattle, WA (US)

(72) Inventors: Jonathan Barak Flowers, Seattle, WA (US); Graydon Loar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 271 days.

(21) Appl. No.: 17/535,063

(22) Filed: Nov. 24, 2021

(51) Int. Cl.
| *G06T 17/05* | (2011.01) |
| *G06T 7/521* | (2017.01) |
| *G06T 19/00* | (2011.01) |
| *G08G 5/80* | (2025.01) |

(52) U.S. Cl.
CPC ............. *G06T 17/05* (2013.01); *G06T 7/521* (2017.01); *G06T 19/003* (2013.01); *G08G 5/80* (2025.01); *G06T 2207/10032* (2013.01)

(58) Field of Classification Search
None
See application file for complete search history.

(56) References Cited

U.S. PATENT DOCUMENTS

| 2014/0293011 | A1* | 10/2014 | Lohry | G06V 10/145 |
| | | | | 348/46 |
| 2015/0349882 | A1* | 12/2015 | Lamkin | H04B 10/1123 |
| | | | | 398/121 |
| 2017/0043982 | A1* | 2/2017 | Wang | G01V 8/12 |
| 2018/0312069 | A1* | 11/2018 | McClymond | B60L 53/51 |
| 2019/0061942 | A1* | 2/2019 | Miller | G05D 1/0061 |
| 2020/0150217 | A1* | 5/2020 | Choi | G02B 27/48 |

OTHER PUBLICATIONS

M. Ikura, L. Miyashita and M. Ishikawa, "Real-time Landing Gear Control System Based on Adaptive 3D Sensing for Safe Landing of UAV," 2020 IEEE/SICE International Symposium on System Integration (SII), Honolulu, Hi, USA, 2020, pp. 759-764, doi: 10.1109/SII46433.2020.9026177. (Year: 2020).*

(Continued)

*Primary Examiner* — Clifford Hilaire
(74) *Attorney, Agent, or Firm* — Athorus, PLLC

(57) ABSTRACT

Systems and methods for environment mapping by aerial vehicles may comprise emitting light having various attributes from one or more light sources, capturing imaging data of the emitted light upon one or more surfaces within an environment using one or more imaging devices, and processing the imaging data to determine surface geometries of the surfaces. The light sources and imaging devices may be onboard the aerial vehicle and may perform various functions during horizontal flight operations, but the light sources and imaging devices may be leveraged to perform environment mapping functions during vertical flight operations. Further, the aerial vehicle may communicate with and leverage additional light sources external to the aerial vehicle in order to further facilitate accurate and reliable environment mapping of surfaces within an environment, e.g., during landing and/or delivery operations.

20 Claims, 10 Drawing Sheets

(56) References Cited

OTHER PUBLICATIONS

Yu Y, Lau DL, Ruffner MP, Liu K. Dual-projector structured light 3D shape measurement. Applied Optics. Feb. 1, 2020;59(4):964-74. (Year: 2020).*

Yang G, Sun C, Wang P, Xu Y. High-speed scanning stroboscopic fringe-pattern projection technology for three-dimensional shape precision measurement. Applied optics. Jan. 10, 2014;53(2):174-83. (Year: 2014).*

Tabata S, Noguchi S, Watanabe Y, Ishikawa M. High-speed 3D sensing with three-view geometry using a segmented pattern. In 2015 IEEE/RSJ International Conference on Intelligent Robots and Systems (IROS) Sep. 28, 2015 (pp. 3900-3907). IEEE. (Year: 2015).*

\* cited by examiner

SYSTEMS AND METHODS FOR ENVIRONMENT MAPPING BY AERIAL VEHICLES LEVERAGING ONBOARD LIGHT SOURCES

BACKGROUND

Unmanned vehicles, such as unmanned aerial vehicles ("UAV"), are continuing to increase in use. With such increasing use, there is an increasing need for safe, efficient, and reliable mapping of operating environments. For example, reliable detection and mapping of ground surfaces is needed to enable safe, efficient, and reliable operations during takeoff, landing, delivery, and various other operations. Accordingly, there is a need for improved systems and methods to facilitate environment mapping by unmanned aerial vehicles to ensure safe, efficient, and reliable operations.

DETAILED DESCRIPTION

Figure 1:
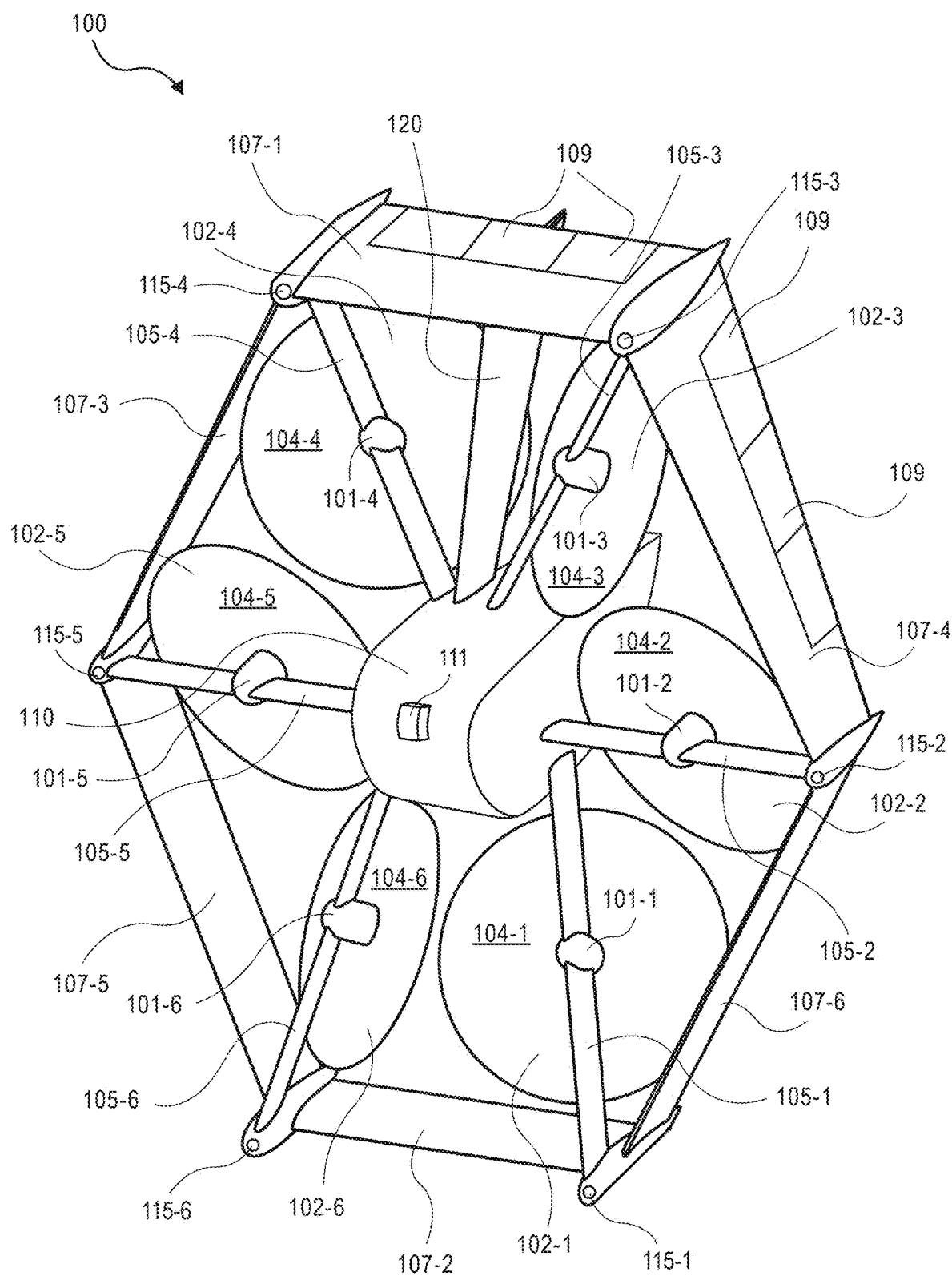
FIG. 1 is a schematic perspective view diagram of an example aerial vehicle including a plurality of light sources and a plurality of imaging devices, in accordance with implementations of the present disclosure.

As is set forth in greater detail below, implementations of the present disclosure are directed to systems and methods for environment mapping by aerial vehicles using light emission from onboard light sources and/or additional light sources, e.g., structured light emission, or other types of emitted light.

Aerial vehicles may include various types of light sources, including light sources to aid visibility in desired directions, light sources for identification, anti-collision light sources, strobing lights, beacon lights, position lights, and/or other types of light sources for safety, visibility, navigation, landing, delivery, takeoff, or other purposes. Some of the various types of light sources may be provided onboard aerial vehicles in order to comply with various rules or regulations associated with aerial vehicles and their operations.

In addition, aerial vehicles may include various types of imaging devices, including color or RGB (red-green-blue) cameras, black-and-white cameras, stereovision camera pairs, telephoto cameras, infrared cameras, long-wave infrared cameras, and/or other types of imaging devices or sensors. Some of the various types of imaging devices may capture imaging data of surfaces, such as ground surfaces, in order to detect and map surfaces for navigation, landing, delivery, takeoff, or other operations.

In example embodiments, one or more light sources onboard aerial vehicles may be leveraged or selected to emit light having various attributes toward surfaces, such as ground surfaces, in order to facilitate more reliable and effective detection and mapping of such surfaces using one or more imaging devices onboard the aerial vehicles. For example, one or more anti-collision light sources that may generally emit visible light at desired strobing frequencies during horizontal flight operations may be leveraged or selected to emit light having various attributes toward ground surfaces during vertical flight operations.

The various attributes of light to be emitted by the selected light sources may include various wavelengths of light, strobing frequencies, and/or patterns of structured light. In addition, if multiple light sources are selected to emit light toward ground surfaces to aid in detection and mapping, each of the multiple light sources may emit light from different respective positions and having various different attributes, such as different wavelengths of light, different strobing frequencies, and/or different patterns of structured light.

Further, one or more imaging devices onboard the aerial vehicles may be selected to capture imaging data of the emitted light from the selected light sources upon the ground surfaces. The captured imaging data may be processed to determine surface geometries associated with the ground surfaces, e.g., using structured light detection and processing techniques or algorithms, or other imaging data processing techniques or algorithms.

In additional example embodiments, one or more additional light sources in environments proximate the aerial vehicles may also be leveraged or selected to emit light having various attributes toward surfaces, such as ground surfaces, in order to facilitate more reliable and effective detection and mapping of such surfaces using one or more imaging devices onboard the aerial vehicles. For example, the one or more additional light sources may comprise outdoor lights associated with homes, buildings, or other structures, fixed or static outdoor lights or lamps, lights associated with other automated vehicles, such as ground-based vehicles or aerial vehicles, and/or movable, mobile, or static connected home devices, such as smart or connected lights, smart doorbells, smart security systems, voice-controlled smart devices, and/or various other types of smart home devices.

Then, the aerial vehicles may establish communication connections with the one or more additional light sources, select various attributes of light to be emitted by the additional light sources, instruct emission of light by the additional light sources toward the ground surfaces, and capture or detect the emitted light from the additional light sources upon the ground surfaces. The captured imaging data from the additional light sources may also be processed to determine surface geometries associated with the ground surfaces, e.g., using structured light detection and processing techniques or algorithms, or other imaging data processing techniques or algorithms.

In this manner, the systems and methods for environment mapping by aerial vehicles described herein may leverage one or more light sources onboard the aerial vehicles, and/or one or more additional light sources in environments proximate the aerial vehicles, to facilitate more reliable and effective detection and mapping of surfaces, such as ground surfaces, using one or more imaging devices onboard the aerial vehicles.

FIG. 1 is a schematic perspective view diagram of an example aerial vehicle 100 including a plurality of light sources and a plurality of imaging devices, in accordance with implementations of the present disclosure.

The example aerial vehicle 100 includes six propulsion mechanisms 102-1, 102-2, 102-3, 102-4, 102-5, and 102-6 spaced about the fuselage 110 of the aerial vehicle 100. While the propulsion mechanisms 102 may include motors 101-1, 101-2, 101-3, 101-4, 101-5, and 101-6 and propellers 104-1, 104-2, 104-3, 104-4, 104-5, and 104-6, in other implementations, other forms of propulsion may be utilized as the propulsion mechanisms 102. For example, one or more of the propulsion mechanisms 102 of the aerial vehicle 100 may utilize fans, jets, turbojets, turbo fans, jet engines, and/or the like to maneuver the aerial vehicle. Generally described, a propulsion mechanism 102, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 102-1, 102-2, 102-3, 102-4, 102-5, and 102-6) may be configured such that their individual orientations may be dynamically modified (e.g., change from vertical to horizontal flight orientation or any position therebetween).

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

In this implementation, the example aerial vehicle 100 also includes a ring wing 107 having a substantially hexagonal shape that extends around and forms the perimeter of the aerial vehicle 100. In the illustrated example, the ring wing has six sections or segments 107-1, 107-2, 107-3, 107-4, 107-5, and 107-6 that are joined at adjacent ends to form the ring wing 107 around the aerial vehicle 100. Each segment of the ring wing 107 has an airfoil shape to produce lift when the aerial vehicle is oriented as illustrated in FIG. 1 and moving in a direction that is substantially horizontal. As illustrated, and discussed further below, the ring wing is positioned at an angle with respect to the fuselage 110 such that the lower segment 107-2 of the ring wing acts as a front wing as it is toward the front of the aerial vehicle when oriented as shown and moving in a horizontal direction. The upper segment 107-1 of the ring wing, which has a longer chord length than the lower segment 107-2 of the ring wing 107, is farther back and thus acts as a rear wing.

The ring wing 107 is secured to the fuselage 110 by motor arms 105. In this example, all six motor arms 105-1, 105-2, 105-3, 105-4, 105-5, and 105-6 are coupled to the fuselage at one end, extend from the fuselage 110 and couple to the ring wing 107 at a second end, thereby securing the ring wing 107 to the fuselage 110. In other implementations, less than all of the motor arms may extend from the fuselage 110 and couple to the ring wing 107. For example, motor arms 105-2 and 105-5 may be coupled to the fuselage 110 at one end and extend outward from the fuselage but not couple to the ring wing 107.

In some implementations, the example aerial vehicle may also include one or more stabilizer fins 120 that extend from the fuselage 110 to the ring wing 107. The stabilizer fin 120 may also have an airfoil shape. In the illustrated example, the stabilizer fin 120 extends vertically from the fuselage 110 to the ring wing 107. In other implementations, the stabilizer fin may be at other positions. For example, the stabilizer fin may extend downward from the fuselage between motor arm 105-1 and motor arm 105-6.

In general, one or more stabilizer fins may extend from the fuselage 110, between any two motor arms 105 and couple to an interior of the ring wing 107. For example, stabilizer fin 120 may extend upward between motor arms 105-3 and 105-4, a second stabilizer fin may extend from the fuselage and between motor arms 105-5 and 105-6, and a third stabilizer fin may extend from the fuselage and between motor arms 105-1 and 105-2.

Likewise, while the illustrated example shows the stabilizer fin extending from the fuselage 110 at one end and coupling to the interior of the ring wing 107 at a second end, in other implementations, one or more of the stabilizer fin(s) may extend from the fuselage and not couple to the ring wing or may extend from the ring wing and not couple to the fuselage. In some implementations, one or more stabilizer fins may extend from the exterior of the ring wing 107, one or more stabilizer fins may extend from the interior of the ring wing 107, one or more stabilizer fins may extend from the fuselage 110, and/or one or more stabilizer fins may extend from the fuselage 110 and couple to the interior of the ring wing 107.

The fuselage 110, motor arms 105, stabilizer fin 120, and ring wing 107 of the example aerial vehicle 100 may be formed of any one or more suitable materials, such as graphite, carbon fiber, and/or aluminum.

Each of the propulsion mechanisms 102 are coupled to a respective motor arm 105 (or propulsion mechanism arm) such that the propulsion mechanism 102 is substantially contained within the perimeter of the ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102-1, 102-2, 102-3, 102-4, 102-5, and 102-6 is coupled at an approximate mid-point of the respective motor arm 105-1, 105-2, 105-3, 105-4, 105-5, and 105-6 between the fuselage 110 and the ring wing 107. In other embodiments, some propulsion mechanisms 102 may be coupled toward an end of the respective motor arm 105. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 110 or closer toward the ring wing 107).

As illustrated, the propulsion mechanisms 102 may be oriented at different angles with respect to each other. For example, propulsion mechanisms 102-2 and 102-5 are aligned with the fuselage 110 such that the force generated by each of propulsion mechanisms 102-2 and 102-5 is in-line or in the same direction or orientation as the fuselage. In the illustrated example, the example aerial vehicle 100 is oriented for horizontal flight such that the fuselage is oriented horizontally in the direction of travel. In such an orientation, the propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage 110. When the example aerial vehicle 100 is oriented horizontally as shown in FIG. 1 for horizontal flight, the propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, the propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5.

In some implementations, one or more segments of the ring wing 107 may include ailerons, control surfaces, and/or trim tabs 109 that may be adjusted to control the aerial flight of the aerial vehicle 100. For example, one or more ailerons, control surfaces, and/or trim tabs 109 may be included on the upper segment 107-1 of the ring wing 107 and/or one or more ailerons, control surfaces, and/or trim tabs 109 may be included on the side segments 107-4 and/or 107-3. Further, one or more ailerons, control surfaces, and/or trim tabs 109 may also be included on one or more of the remaining segments 107-2, 107-5, and 107-6. The ailerons, control surfaces, and/or trim tabs 109 may be operable to control the pitch, yaw, and/or roll of the aerial vehicle during horizontal flight when the example aerial vehicle 100 is oriented as illustrated in FIG. 1.

The angle of orientation of each of the propulsion mechanisms 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, and/or may each be oriented in different amounts and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about the second motor arm 105-2 and oriented toward propulsion mechanism 102-3. Finally, propulsion mechanism 102-4 is oriented approximately thirty degrees in the first direction about the fourth motor arm 105-4 and toward propulsion 102-5. As illustrated, propulsion mechanisms 102-2 and 102-5, which are on opposing sides of the fuselage 110, are aligned and oriented in a same first direction (in this example, horizontal). Propulsion mechanisms 102-3 and 102-6, which are on opposing sides of the fuselage 110, are aligned and oriented in a same second direction, which is angled compared to the first direction. Propulsion mechanisms 102-1 and 102-4, which are on opposing sides of the fuselage 110, are aligned and oriented in a same third direction, which is angled compared to the first direction and the second direction.

As shown in the FIG. 1, the example aerial vehicle may also include one or more light sources 111, 115. For example, a light source 111 may be associated with a portion of the fuselage 110, and one or more light sources 115 may be associated with portions or segments of the ring wing 107 and/or motor arms 105. In the illustrated implementation, a plurality of light sources 115-1, 115-2, 115-3, 115-4, 115-5, 115-6 may be positioned or associated at or proximate respective ends of the motor arms 105-1, 105-2, 105-3, 105-4, 105-5, 105-6, and/or at or proximate joints between respective wing segments 107-1, 107-2, 107-3, 107-4, 107-5, 107-6. In some examples, the light source 111 may comprise a plurality of light sources that are coupled to portions of the fuselage 110 and spaced apart from each other. Various additional light sources may be associated with or coupled to portions, segments, or components of the aerial vehicle at various other locations or positions.

The various light sources 111, 115 may comprise various types of light sources, including light sources to aid visibility in desired directions, light sources for identification, anti-collision light sources, strobing lights, beacon lights, position lights, and/or other types of external aerial vehicle light sources for safety, visibility, navigation, landing, delivery, takeoff, or other purposes. For example, the various light sources may comprise light emitting diodes (LEDs), light bulbs, infrared light emitters, laser projectors, digital light processing (DLP) projectors, and/or other types of light sources. In some example embodiments, the light source 111 may comprise an anti-collision beacon or light source. In addition, the light sources 115 may comprise anti-collision strobes, identification lights, navigation lights, and/or position lights located substantially around a periphery of the aerial vehicle 100. As described herein, one or more of the various light sources 111, 115 may be leveraged or selected to aid in detection and mapping of surfaces in environments proximate the example aerial vehicle.

Figure 2:
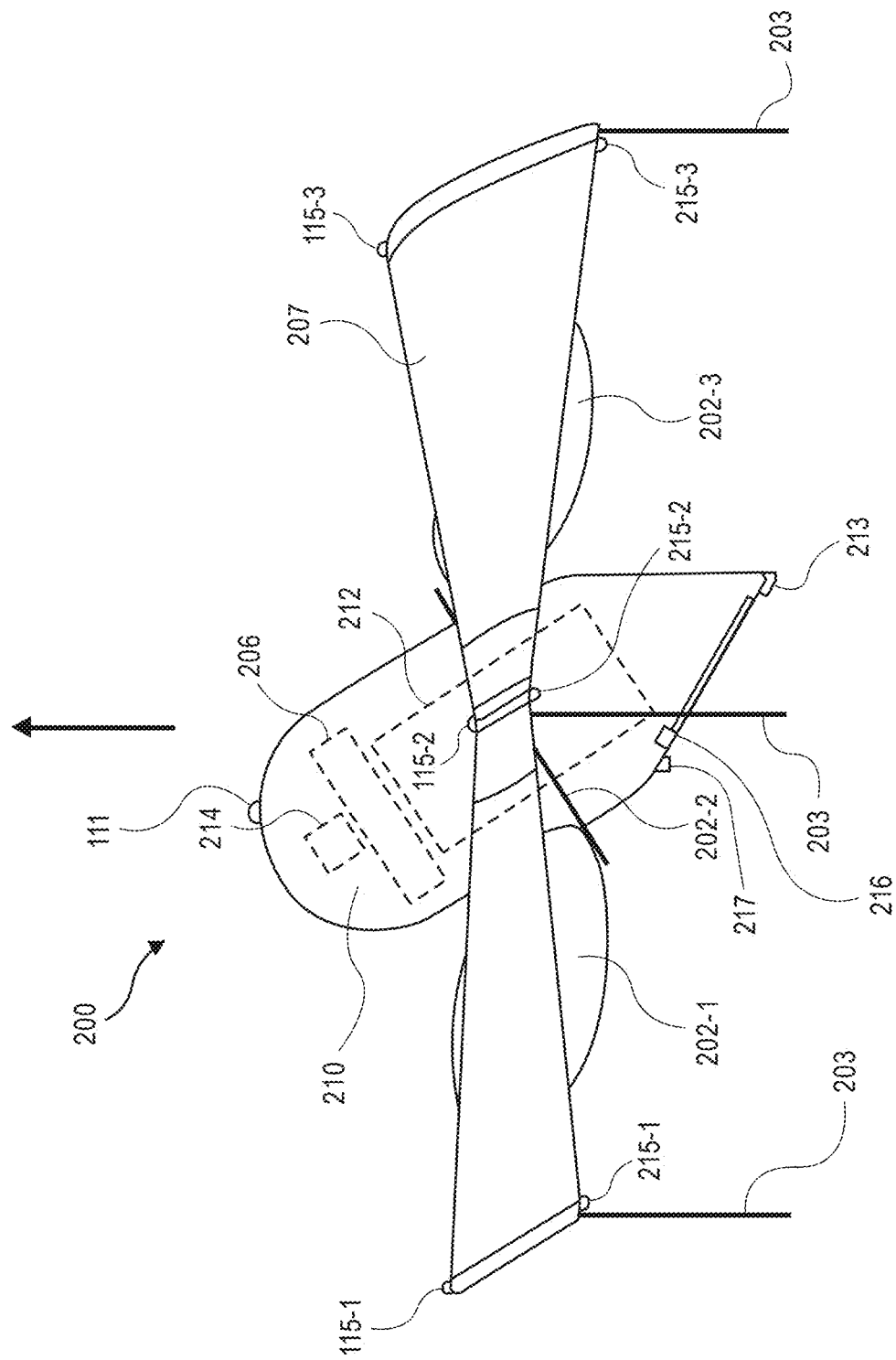
FIG. 2 is a schematic side view diagram of an example aerial vehicle including a plurality of light sources and a plurality of imaging devices oriented for vertical takeoff and landing (VTOL), in accordance with implementations of the present disclosure.

FIG. 2 is a schematic side view diagram of an example aerial vehicle 200 including a plurality of light sources and a plurality of imaging devices oriented for vertical takeoff and landing (VTOL), in accordance with implementations of the present disclosure. The aerial vehicle 200 may include any and all of the features of the aerial vehicle 100 discussed above with respect to FIG. 1. When oriented as illustrated in FIG. 2, the aerial vehicle 200 may maneuver in any of the six degrees of freedom (pitch, yaw, roll, heave, surge, and sway), thereby enabling VTOL and high maneuverability.

As illustrated, when the example aerial vehicle is oriented for VTOL, the motor arms and the ring wing 207 are aligned approximately horizontally and in the same plane. In this orientation, each of the propulsion mechanisms are offset or angled with respect to the horizontal and/or vertical direction. As such, each propulsion mechanism 202-1, 202-2, 202-3, when generating a force, generates a force that includes both a horizontal component and a vertical component. In the illustrated example, each propulsion mechanism is angled approximately thirty degrees with respect to vertical. Likewise, as discussed above, adjacent propulsion mechanisms are angled in opposing directions to form pairs of propulsion mechanisms. For example, propulsion mechanism 202-2 is oriented toward propulsion mechanism 202-3. As discussed further below, angling adjacent propulsion mechanisms toward one another to form pairs of propulsion mechanisms allows horizontal forces from each propulsion mechanism to cancel out such that the pair of propulsion mechanisms can produce a net vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when the example aerial vehicle 200 is oriented for VTOL with angled propulsion mechanisms, as illustrated in FIG. 2, the aerial vehicle can move independently in any of the six degrees of freedom. For example, if the aerial vehicle is to surge in the X direction, it can do so by altering the forces produced by the propulsion mechanisms to generate a net horizontal force in the X direction without having to pitch forward to enable a surge in the X direction.

To enable the fuselage to be oriented horizontally with an offset ring wing 207 during horizontal flight, as illustrated in FIG. 1, the fuselage is rotated at an angle when the example aerial vehicle 200 is oriented for VTOL, as illustrated in FIG. 2. In this example, the fuselage 210 is angled at approximately thirty degrees from vertical. In other implementations, the amount of rotation from vertical may be greater or less depending on the amount of offset desired for the ring wing 207 when the example aerial vehicle 200 is oriented for horizontal flight.

The example aerial vehicle may also include one or more landing gears 203 that are extendable to a landing position, as illustrated in FIG. 2. During flight, the landing gear 203 may be retracted into the interior of the ring wing 207 and/or may be rotated up and remain along the trailing edge of the ring wing. In still other examples, the landing gear may be permanently affixed.

The fuselage 210 may be used to house or store one or more components of the example aerial vehicle, such as the aerial vehicle control system 214, power module(s) 206, and/or a payload 212 that is transported by the aerial vehicle. In addition, the fuselage 210 may also include a payload or package delivery apparatus 216 configured to open, close, receive, and release the package or payload 212. The aerial vehicle control system 214 is discussed further below at least with respect to FIG. 9. The power module(s) 206 may be removably mounted to the aerial vehicle 200. The power module(s) 206 for the aerial vehicle may be, for example, in the form of battery power, solar power, gas power, super capacitor, fuel cell, alternative power generation source, or a combination thereof. The power module(s) 206 are coupled to and provide power for the aerial vehicle control system 214, the propulsion mechanisms 202, the package delivery apparatus 216, various light sources, imaging devices, and/or other components.

In some implementations, one or more of the power module(s) 206 may be configured such that it can be autonomously removed and/or replaced with another power module. For example, when the example aerial vehicle lands at a delivery location, relay location and/or materials handling facility, the aerial vehicle may engage with a charging member at the location that will recharge the power module.

The package or payload 212 may be any payload that is to be transported by the example aerial vehicle. In some implementations, the aerial vehicle may be used to aerially deliver items ordered by customers for aerial delivery and the payload may include one or more customer ordered items. For example, a customer may order an item from an electronic commerce website and the item may be delivered to a customer-specified delivery location using the example aerial vehicle 200. In example embodiments, the package or payload 212 may be shaped as a substantially rectangular prism, such as a box, container, crate, or other package.

As shown in the FIG. 2, in addition to the light sources 111, 115 described herein at least with respect to FIG. 1, the example aerial vehicle may also include one or more light sources 213, 215. For example, the light sources 111, 115 may generally be associated with a forward-facing portion of the aerial vehicle in a horizontal flight orientation, or an upper side of the aerial vehicle in a VTOL orientation. In addition, the light sources 213, 215 may generally be associated with a rearward-facing portion of the aerial vehicle in a horizontal flight orientation, or a lower side of the aerial vehicle in a VTOL orientation. Further, a light source 213 may be associated with a portion of the fuselage 210, and one or more light sources 215 may be associated with portions or segments of the ring wing 207 and/or motor arms. In the illustrated implementation, a plurality of light sources 215-1, 215-2, 215-3 may be positioned or associated at or proximate respective ends of the motor arms, and/or at or proximate joints between respective wing segments of the ring wing 207. In some examples, the light source 213 may comprise a plurality of light sources that are coupled to portions of the fuselage 210 and spaced apart from each other. Various additional light sources may be associated with or coupled to portions, segments, or components of the aerial vehicle at various other locations or positions.

The various light sources 213, 215 may comprise various types of light sources, including light sources to aid visibility in desired directions, light sources for identification, anti-collision light sources, strobing lights, beacon lights, position lights, and/or other types of external aerial vehicle light sources for safety, visibility, navigation, landing, takeoff, or other purposes. For example, the various light sources may comprise light emitting diodes (LEDs), light bulbs, infrared light emitters, laser projectors, digital light processing (DLP) projectors, and/or other types of light sources. In some example embodiments, the light source 213 may comprise one or more anti-collision beacons or light sources. In other example embodiments, the light source 213 may comprise one or more landing or delivery lights that emit light generally downward in the VTOL orientation and are configured to illuminate a ground surface, delivery location, and/or a package that has been delivered. In addition, the light sources 215 may comprise anti-collision strobes, identification light, navigation lights, and/or position lights located substantially around a periphery of the aerial vehicle 200. As described herein, one or more of the various light sources 213, 215 may be leveraged or selected to aid in detection and mapping of surfaces in environments proximate the example aerial vehicle.

Further, as shown in FIG. 2, one or more imaging devices 217 may be associated with or coupled to various portions, segments, or components of the aerial vehicle 200. In the illustrated implementation, the imaging device 217 may be coupled to a portion of the fuselage 210, and may be oriented to have a field of view that points substantially downward from the fuselage 210 when the aerial vehicle 200 is in a VTOL orientation. Although not illustrated in FIG. 2, various additional imaging devices may be associated with or coupled to portions, segments, or components of the aerial vehicle at various other locations or positions. The various imaging devices 217 may comprise various types of imaging devices, including color or RGB cameras, black-and-white cameras, stereovision camera pairs, telephoto cameras, infrared cameras, long-wave infrared cameras, and/or other types of imaging devices or sensors. As described herein, one or more of the various types of imaging devices 217, operating in coordination with one or more light sources 111, 115, 213, 215, may capture imaging data of surfaces, such as ground surfaces, in order to detect and map surfaces for navigation, landing, delivery, takeoff, or other operations.

Figure 3:
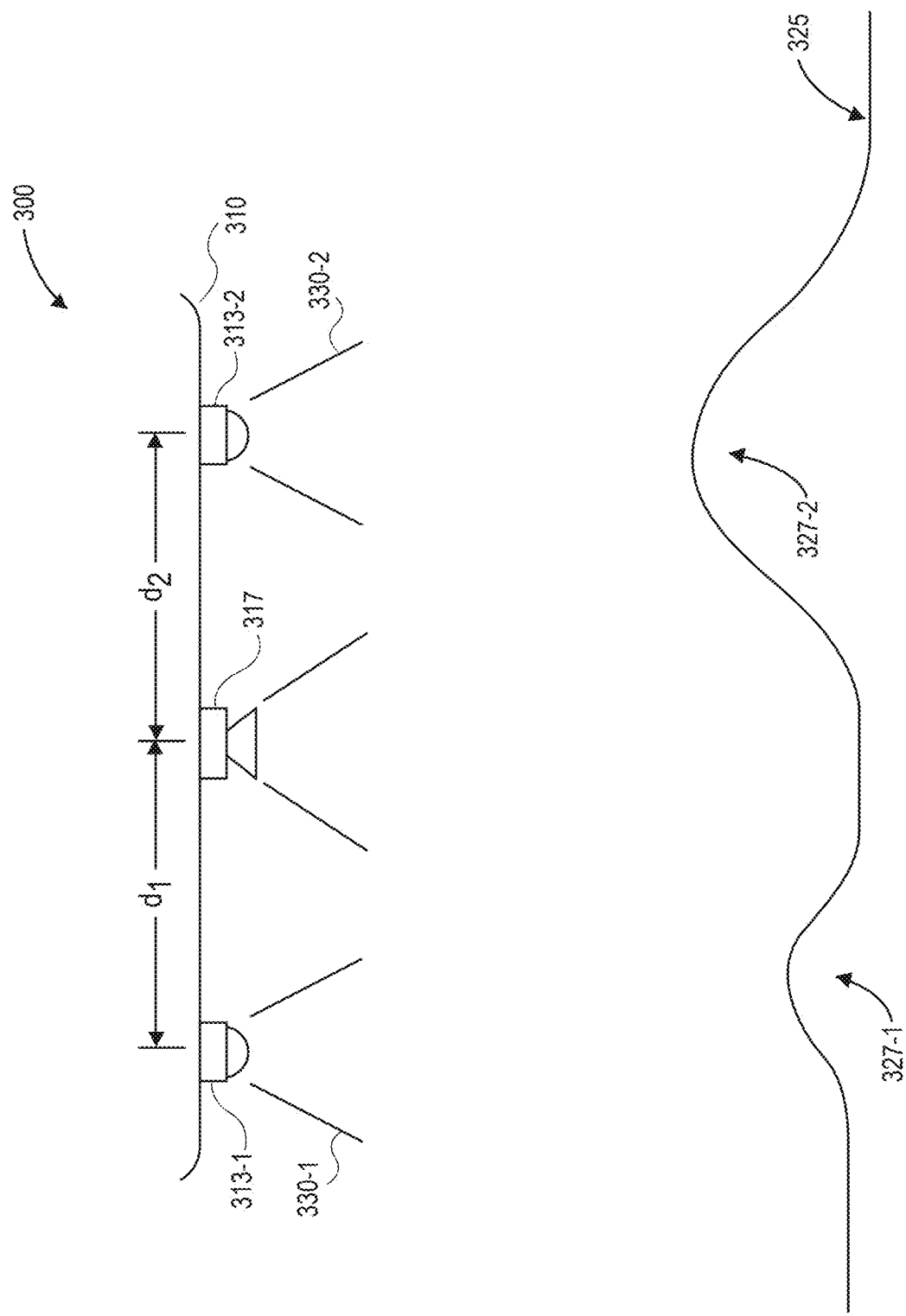
FIG. 3 is a schematic side view diagram of a portion of an example aerial vehicle including one or more light sources and imaging devices in an example environment, in accordance with implementations of the present disclosure.

FIG. 3 is a schematic side view diagram of a portion of an example aerial vehicle 300 including one or more light sources and imaging devices in an example environment, in accordance with implementations of the present disclosure. The portion of the aerial vehicle 300 may include any and all of the features of one or more portions of the aerial vehicles 100, 200 discussed above with respect to FIGS. 1 and 2.

As shown in FIG. 3, a portion of an example aerial vehicle 300 may include a fuselage or body 310, one or more light sources 313, and/or one or more imaging devices 317. The one or more light sources 313-1, 313-2 may emit light 330-1, 330-2 in a substantially downward direction from the example aerial vehicle 300, e.g., when the aerial vehicle is in a VTOL orientation. In addition, the one or more imaging devices 317 may also have respective fields of view that point in a substantially downward direction from the example aerial vehicle 300, e.g., when the aerial vehicle is in a VTOL orientation.

In some example embodiments, the one or more light sources 313-1, 313-2 may be coupled to portions of the fuselage or body 310 and spaced apart from each other, e.g., by a known distance or separation. In addition, the one or more imaging devices 317 may also be coupled to portions of the fuselage or body 310 at known positions. Furthermore, as shown in the example of FIG. 3, the one or more light sources 313-1, 313-2 may be positioned on opposite sides of an imaging device 317 and spaced apart from the imaging device 317 by known distances or separations, e.g., a first distance $d_1$ between a first light source 313-1 and the imaging device 317, and a second distance $d_2$ between a second light source 313-2 and the imaging device 317. Other example embodiments may include other configurations, arrangements, positions, orientations, or combinations of the one or more light sources 313 and one or more imaging devices 317.

The example environment illustrated in FIG. 3 may include a surface 325, e.g., a ground surface, and the surface 325 may include one or more surface geometries, dimensions, features, slopes, formations, irregularities, objects, or other characteristics 327. For example, the example environment of FIG. 3 may include a first slope, ridge, hill, or formation 327-1 and a second slope, ridge, hill, or formation 327-2. Other example environments may include other configuration, arrangements, or combinations of various surface geometries, dimensions, features, slopes, formations, irregularities, objects, or other characteristics.

Although FIG. 3 illustrates two light sources 313 and one imaging device 317 coupled to a fuselage 310 of an example aerial vehicle, other example embodiments may include only a single light source, more than two light sources coupled to the fuselage, one or more light sources coupled to motor arms, wings, or other portions or components of an aerial vehicle, more than one imaging device coupled to the fuselage, one or more imaging devices coupled to motor arms, wings, or other portions or components of an aerial vehicle, and/or various other combinations of light sources and imaging devices.

In example embodiments, when the example aerial vehicle 300 is in a horizontal orientation or engaged in horizontal flight operations, the one or more light sources 313 may perform various operations to aid navigation and flight. For example, the light sources 313 may operate as anti-collision lights or strobes that blink, strobe, or illuminate at desired strobing frequencies. In addition, the light sources 313 may operate as anti-collision lights or beacons that rotate, spin, or move while illuminated. Further, the light sources 313 may operate as position or navigation lights that may remain steadily illuminated during horizontal flight operations. Alternatively, the light sources 313 may remain unilluminated during horizontal flight operations. Moreover, when the example aerial vehicle 300 is in a horizontal orientation or engaged in horizontal flight operations, the imaging devices 317 may also perform various operations to aid navigation and flight. For example, the imaging devices 317 may operate to detect airborne objects, other objects, or aerial vehicles in proximity, and imaging data captured by the imaging devices 317 may be processed to aid object or collision avoidance and thereby ensure safe navigation and flight. Further, the imaging devices 317 may operate to detect objects, landmarks, landforms, buildings, surfaces, or other features within environments, and imaging data captured by the imaging devices 317 may be processed to aid navigation and position/orientation detection and thereby ensure safe navigation and flight. Alternatively, the imaging devices 317 may not be operational during horizontal flight operations.

In some example embodiments, when the example aerial vehicle 300 is in a VTOL orientation or engaged in vertical flight operations, the one or more light sources 313 and the one or more imaging devices 317 may be leveraged or selected to perform operations to detect and map one or more surfaces within the environment, e.g., the ground surface 325 shown in FIG. 3. In other example embodiments, when the example aerial vehicle 300 is at a position proximate a landing or takeoff location, delivery location, or other location having one or more surfaces that are to be detected and mapped, the one or more light sources 313 and the one or more imaging devices 317 may be leveraged or selected to perform operations to detect and map one or more surfaces within the environment, e.g., the ground surface 325 shown in FIG. 3.

In order to detect and map one or more surfaces within the environment, the selected light sources 313 may be instructed to emit light toward a surface 325 with various selected attributes of light, e.g., wavelengths of light, strobing frequencies, and/or patterns of structured light. In addition, the selected imaging devices 317 may capture and detect the emitted light from the selected light sources 313 upon the surface 325. Based on the known attributes of light emitted by selected light sources 313, as well as the known distances, separations, positions, and/or orientations of the light sources 313 and imaging devices 317 relative to each other, the captured imaging data may be processed by various imaging data processing techniques or algorithms, such as structured light detection and processing techniques or algorithms, or other imaging data processing techniques or algorithms.

Based on the processing of the imaging data, various surface geometries, dimensions, features, slopes, formations, irregularities, objects, or other characteristics of one or more surfaces within an example environment proximate an aerial vehicle may be detected or determined. Then, various models or maps of surfaces within example environments, e.g., three-dimensional models or maps, may be generated or developed including data related to surface geometries, dimensions, features, slopes, formations, irregularities, objects, or other characteristics. Furthermore, the generated maps or models of surfaces within example environments may be used to aid navigation, landing, delivery, takeoff, or other operations of aerial vehicles within such environments.

Figure 4A:
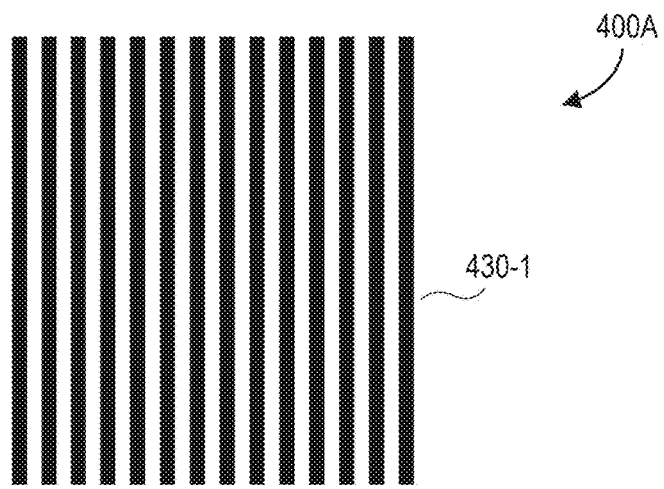
FIG. 4A is a schematic diagram of example structured light emitted by one or more light sources, in accordance with implementations of the present disclosure.

FIG. 4A is a schematic diagram 400A of example structured light emitted by one or more light sources, in accordance with implementations of the present disclosure.

In example embodiments, the light emitted by one or more light sources, e.g., light sources 313 of FIG. 3, that is directed toward a surface may include various different attributes. For example, the various attributes of emitted light may include different wavelengths of light, different strobing frequencies, different patterns of structured light, and/or various other characteristics of light.

The different wavelengths of light may include white light, particular wavelengths of human-visible light, infrared light, and/or other wavelengths or combination of wavelengths of light. In addition, the different strobing frequencies of light may include emitting light at frequencies such as approximately 20 times per minute, 40 times per minute, 50 times per minute, 100 times per minute, or other strobing frequencies. Further, the different patterns of structured light may include points or dot matrices, lines or stripes, repeating shapes or markers such as circles, triangles, squares, or other shapes or markers, known patterns or shapes such as images, characters, logos, trademarks, or other known patterns or shapes, and/or other types of patterns of structured light.

As shown in FIG. 4A, the example light 430-1 that is emitted by a light source toward a surface for detection and mapping of features or characteristics of the surface may comprise a pattern of structured light including lines or stripes that are substantially in black-and-white, and which may be strobed or illuminated at a particular strobing frequency.

In example embodiments in which multiple light sources may be selected or leveraged to facilitate detection and mapping of surfaces within an environment, each of the multiple light sources may emit light having different attributes. For example, a first light source may emit light having particular wavelengths of human-visible light, and a second light source may emit light having wavelengths of infrared light. In addition, a first light source may emit light at a strobing frequency of 30 times per minute, and a second light source may emit light at a strobing frequency of 40 times per minute. Further, a first light source may emit light with a pattern of structured light including points or dot matrices, and a second light source may emit light with a pattern of structured light including repeating shapes such as triangles. Various other combinations of different attributes of light may be used for other combinations of multiple light sources.

By using different wavelengths of light for different light sources, the emitted light that is captured upon the surface may be differentiated or distinguished among the different light sources based on the respective different wavelengths of light. Similarly, by using different strobing frequencies of light for different light sources, the emitted light that is captured upon the surface may be differentiated or distinguished among the different light sources based on the respective different strobing frequencies. In addition, multiple light sources may use the same strobing frequency but offset or out-of-phase from each other, such that different light sources emit light upon the surface at different respective times. Likewise, by using different patterns of structured light for different light sources, the emitted light that is captured upon the surface may be differentiated or distinguished among the different light sources based on the respective different patterns of structured light.

In additional example embodiments, if different light sources emit light with different wavelengths of light, the light sources may also emit light at the same or different strobing frequencies, and/or using the same or different patterns of structured light. Further, if different light sources emit light with different strobing frequencies, the light sources may also emit light at the same or different wavelengths of light, and/or using the same or different patterns of structured light. Moreover, if different light sources emit light with different patterns of structured light, the light sources may also emit light at the same or different wavelengths of light, and/or using the same or different strobing frequencies. Various other attributes of light may also be modified or adjusted, potentially in combination with modifications to wavelengths of light, strobing frequencies, and/or patterns of structured light.

In further example embodiments, various attributes of light may be selected based on one or more other factors. For example, based on ambient light, e.g., sunlight or other outdoor/indoor lights, detected within an environment and/or upon a surface, one or more wavelengths, strobing frequencies, or patterns of light may be selected that may be more reliably detected and distinguished from the attributes of light associated with the ambient light. In addition, based on light pollution from other light sources, e.g. outdoor/indoor lights, reflections, refractions, or others, detected within an environment and/or upon a surface, one or more wavelengths, strobing frequencies, or patterns of light may be selected that may be more reliably detected and distinguished from the attributes of light associated with the light pollution. In addition, when operating at nighttime or in poorly illuminated or darker environments, one or more wavelengths, strobing frequencies, or patterns of light, e.g., infrared light having a pattern of structured points at a relatively lower strobing frequency, may be selected that may still be reliably detected and distinguished, while also reducing the light pollution or disturbance to the environment and/or people or animals proximate the environment.

Figure 4B:
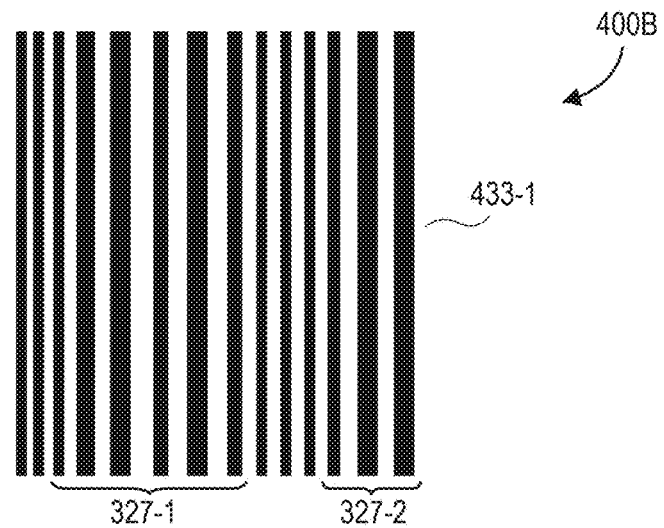
FIG. 4B is a schematic diagram of example imaging data, captured by an imaging device, including at least a portion of the structured light emitted by a first light source, in accordance with implementations of the present disclosure.

FIG. 4B is a schematic diagram 400B of example imaging data, captured by an imaging device, including at least a portion of the structured light emitted by a first light source, in accordance with implementations of the present disclosure.

Referring again to FIGS. 3 and 4A, a first light source 313-1 may emit the example light 430-1 toward the surface 325 for detection and mapping of features or characteristics of the surface. For example, the emitted light 430-1 may comprise a pattern of structured light including lines or stripes that are substantially in black-and-white, and which may be strobed or illuminated at a particular strobing frequency.

Then, the imaging device 317 may capture first imaging data 433-1 of the emitted light from the first light source 313-1 upon the surface 325. If the surface 325 is substantially flat and does not include any surface features, slopes, formations, irregularities, objects, or other characteristics, the captured imaging data may be substantially similar or identical to the emitted light 430-1. In the example of FIG. 3, however, the surface 325 may include first and second surface features 327-1, 327-2. Because of the presence of the surface features 327-1, 327-2 and based on the distance, separation, position, and/or orientation of the first light source 313-1 relative to the imaging device 317, one or more portions of the captured light within the first imaging data 433-1 may be altered, distorted, or modified upon the surface 325 in comparison to the emitted light 430-1. As schematically shown in FIG. 4B, the surface features 327-1, 327-2 may cause alteration, distortion, or modification of portions of the captured light within the first imaging data 433-1. Such alterations, distortions, or modifications of portions of the captured light within the first imaging data 433-1 may then be processed to detect or determine geometries, dimensions, or other aspects of the surface features 327-1, 327-2 upon the surface.

Figure 4C:
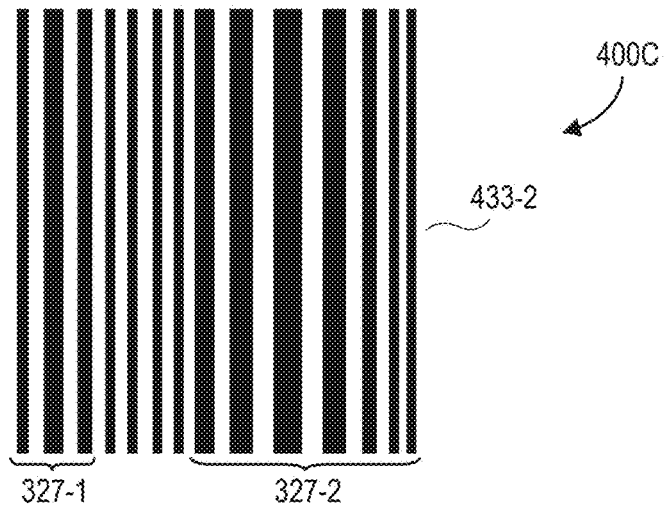
FIG. 4C is a schematic diagram of example imaging data, captured by an imaging device, including at least a portion of the structured light emitted by a second light source, in accordance with implementations of the present disclosure.

FIG. 4C is a schematic diagram 400C of example imaging data, captured by an imaging device, including at least a portion of the structured light emitted by a second light source, in accordance with implementations of the present disclosure.

Referring again to FIGS. 3 and 4A, a second light source 313-2 may also emit the example light 430-1 toward the surface 325 for detection and mapping of features or characteristics of the surface. For example, the emitted light 430-1 may comprise a pattern of structured light including lines or stripes that are substantially in black-and-white, and which may be strobed or illuminated at a particular strobing frequency. In other example embodiments as described herein, the first and second light sources may emit light having various different attributes of light.

Then, the imaging device 317 may capture second imaging data 433-2 of the emitted light from the second light source 313-2 upon the surface 325. If the surface 325 is substantially flat and does not include any surface features, slopes, formations, irregularities, objects, or other characteristics, the captured imaging data may be substantially similar or identical to the emitted light 430-1. In the example of FIG. 3, however, the surface 325 may include first and second surface features 327-1, 327-2. Because of the presence of the surface features 327-1, 327-2 and based on the distance, separation, position, and/or orientation of the second light source 313-2 relative to the imaging device 317, one or more portions of the captured light within the second imaging data 433-2 may be altered, distorted, or modified upon the surface 325 in comparison to the emitted light 430-1. As schematically shown in FIG. 4C, the surface features 327-1, 327-2 may cause alteration, distortion, or modification of portions of the captured light within the second imaging data 433-2. Such alterations, distortions, or modifications of portions of the captured light within the second imaging data 433-2 may then be processed to detect or determine geometries, dimensions, or other aspects of the surface features 327-1, 327-2 upon the surface.

In some example embodiments, only a single light source may emit light having various attributes of light toward a surface, and only a single imaging device may capture imaging data of the emitted light to detect and map geometries, dimensions, or other aspects or characteristics of the surface within the environment. In other example embodiments, multiple light sources may emit light having various potentially different attributes of light toward a surface and multiple imaging devices may capture imaging data of the emitted light in order to detect and map geometries, dimensions, or other aspects or characteristics of the surface within the environment. Generally, the detection and mapping of a surface within an environment may be performed more quickly, efficiently, and reliably with the use of multiple light sources that are at known positions and/or orientations relative to one or more imaging devices that capture imaging data including the emitted light upon the surface.

Further, the processing of the imaging data to detect and map geometries, dimensions, or other aspects or characteristics of a surface within an environment may be performed using various imaging data processing algorithms or techniques. In example embodiments that utilize patterns of structured light emitted by one or more light sources, various structured light imaging data processing techniques or algorithms may be used to process the imaging data and determine geometries, dimensions, or other aspects or characteristics of a surface. Moreover, various other types of imaging data processing, feature or surface mapping, three-dimensional modeling or mapping, and/or other types of techniques or algorithms may be used to process the imaging data and determine geometries, dimensions, or other aspects or characteristics of a surface.

In further example embodiments, in addition to geometries or dimensions of a surface within an environment, the imaging data may be processed to determine various other aspects associated with the surface and/or environment. For example, based on known wavelengths of light emitted by a light source, and based on reflected wavelengths of light captured within imaging data, various material properties associated with the surface may be estimated or determined, such as material type or composition, light reflective properties, light absorptive properties, surface textures, and/or other material properties. In addition, based on known wavelengths of light emitted by a light source, and based on reflected wavelengths of light captured within imaging data, various properties associated with air or other mediums through which the emitted and reflected light are passing may be estimated or determined, such as medium type or composition, particulates or impurities within the medium, and/or other air or medium properties. Various other properties, aspects, or characteristics of surfaces and/or mediums within an environment may be detected or determined using various imaging data processing techniques or algorithms.

Figure 4D:
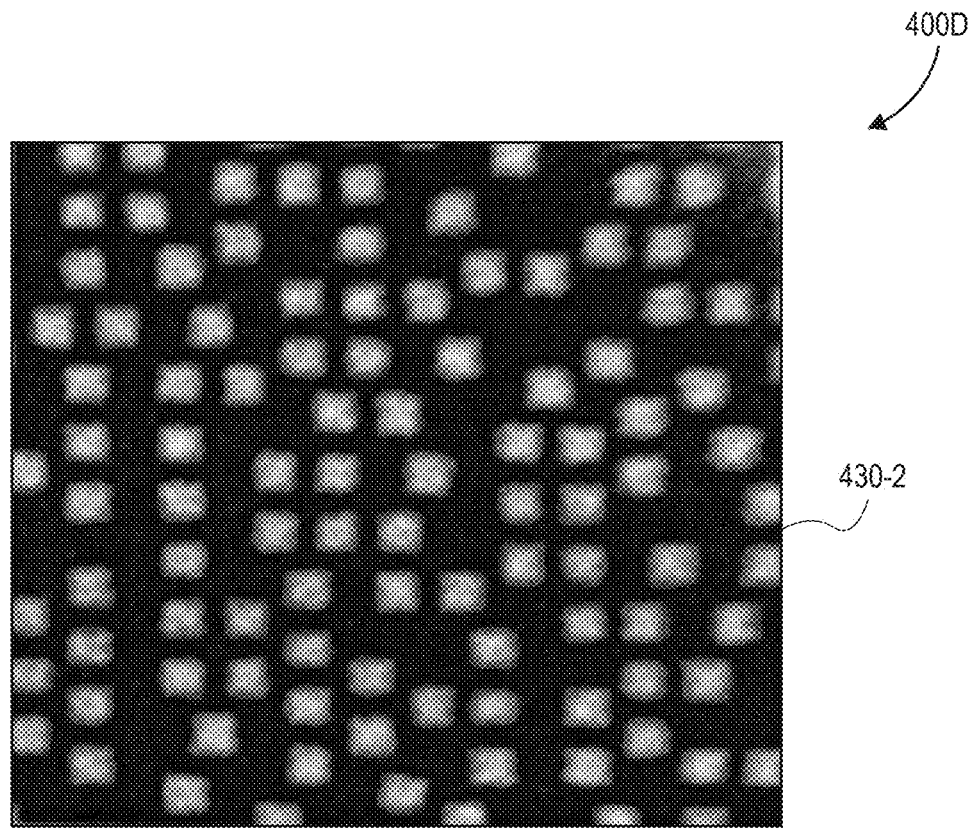
FIG. 4D is a schematic diagram of another example structured light emitted by one or more light sources, in accordance with implementations of the present disclosure.

FIG. 4D is a schematic diagram 400D of another example structured light emitted by one or more light sources, in accordance with implementations of the present disclosure.

As shown in FIG. 4D, the example light 430-2 that is emitted by a light source toward a surface for detection and mapping of features or characteristics of the surface may comprise a pattern of structured light including dots, points, shapes, a dot array, a randomized noise pattern, or other similar structured light pattern. The emitted light 430-2 may be black-and-white, color, or other wavelengths of light, and may be strobed or illuminated at a particular strobing frequency.

In some example embodiments, the emitted light 430-2 may comprise a regular or ordered pattern of dots, points, or any other known or defined shapes. In other example embodiments, similar to that shown in FIG. 4D, the emitted light 430-2 may comprise an irregular or randomized pattern of dots, points, or any other known or defined shapes. Further, the randomized pattern of dots, points, or other shapes may change over time during the strobing of a light source.

Figure 4E:
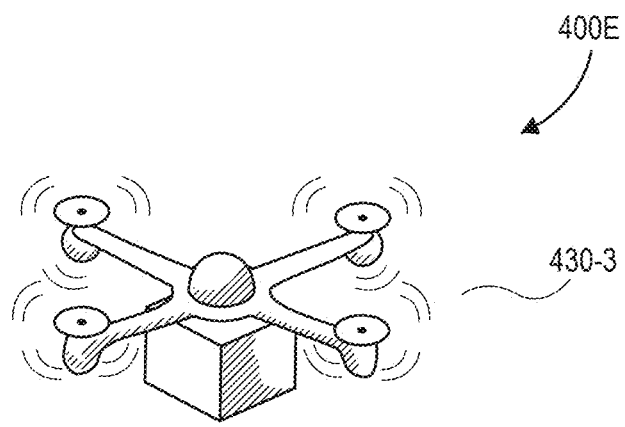
FIG. 4E is a schematic diagram of yet another example structured light emitted by one or more light sources, in accordance with implementations of the present disclosure.

FIG. 4E is a schematic diagram 400E of yet another example structured light emitted by one or more light sources, in accordance with implementations of the present disclosure.

As shown in FIG. 4E, the example light 430-3 that is emitted by a light source toward a surface for detection and mapping of features or characteristics of the surface may comprise a pattern of structured light including a known or defined shape, symbol, character, logo, icon, image, picture, drawing, or other similar structured light pattern. The emitted light 430-3 may be black-and-white, color, or other wavelengths of light, and may be strobed or illuminated at a particular strobing frequency.

In some example embodiments, similar to that shown in FIG. 4E, the emitted light 430-3 may comprise an image, picture, drawing, or any other known or defined shape, e.g., a sketch of an aerial vehicle that is delivering a package. Further, the known or defined shape may change over time during the strobing of a light source.

Figure 5:
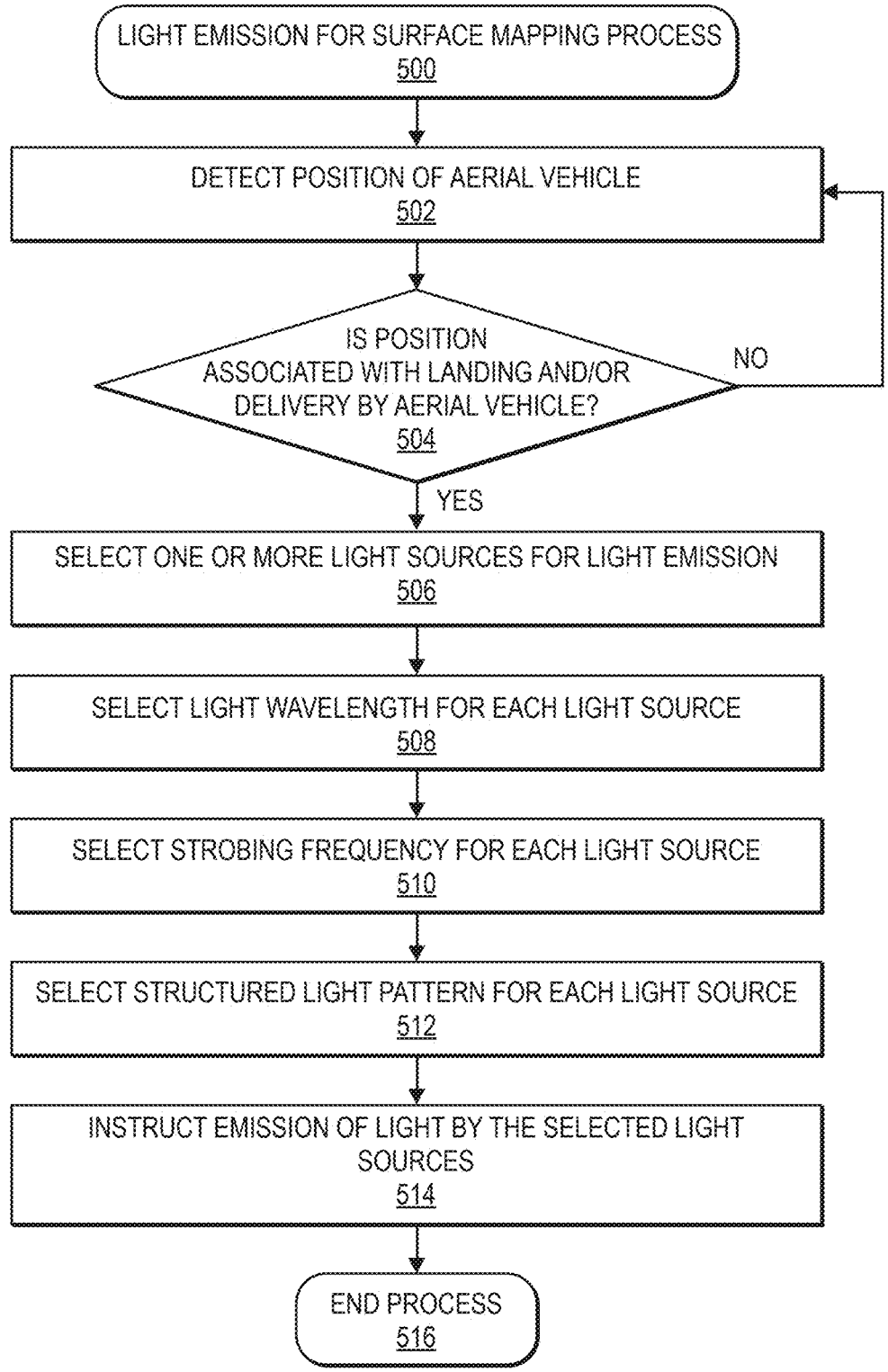
FIG. 5 is a flow diagram illustrating an example light emission for surface mapping process, in accordance with implementations of the present disclosure.

FIG. 5 is a flow diagram illustrating an example light emission for surface mapping process 500, in accordance with implementations of the present disclosure.

The process 500 may begin by detecting a position of an aerial vehicle, as at 502. For example, one or more global positioning sensors (GPS), navigation sensors, inertial measurement units, accelerometers, gyroscopes, or other positioning sensors associated with an aerial vehicle may detect a position and/or orientation of the aerial vehicle. It may be determined whether the aerial vehicle is at or proximate a landing or takeoff location, delivery location, relay location, or other location at which one or more surfaces may be detected and mapped to facilitate aerial vehicle operations. In addition, it may be determined whether the aerial vehicle is configured or oriented for vertical flight operations or in a VTOL orientation, and/or configured or oriented for horizontal flight operations or in a horizontal flight orientation. Further, a controller may detect a position of the aerial vehicle.

The process 500 may continue by determining whether the position is associated with a landing and/or delivery by the aerial vehicle, as at 504. For example, based on data from one or more sensors associated with the aerial vehicle, and/or based on a determination that the aerial vehicle is configured or oriented for vertical flight operations or in a VTOL orientation, it may be determined that the aerial vehicle is engaged in landing and/or delivery operations at a current location. In addition, the aerial vehicle may be engaged in other types of operations, such as takeoff, surveying, search and rescue, or other operations, during which one or more surfaces within the environment may be detected and mapped. Further, a controller may determine whether the position is associated with landing and/or delivery by the aerial vehicle.

If it is determined that the position of the aerial vehicle is not associated with landing, delivery, or other operations associated with detecting and mapping a surface within an environment, the process 500 may return to step 502 and continue to detect a position of the aerial vehicle during performance of various other operations.

If, however, it is determined that the position of the aerial vehicle is associated with landing, delivery, or other operations associated with detecting and mapping a surface within an environment, the process 500 may proceed by selecting one or more light sources for light emission, as at 506. For example, the aerial vehicle may include various types of light sources, including light sources to aid visibility in desired directions, light sources for identification, anti-collision light sources, strobing lights, beacon lights, position lights, and/or other types of external aerial vehicle light sources for safety, visibility, navigation, landing, delivery, takeoff, or other purposes. In addition, the various light sources may comprise light emitting diodes (LEDs), light bulbs, infrared light emitters, laser projectors, digital light processing (DLP) projectors, and/or other types of light sources. In some example embodiments, one or more light sources may perform various functions or operations during horizontal flight operations, such as anti-collision lighting, position lighting, or other safety or navigation purposes. Responsive to determining that the aerial vehicle is engaged in landing and/or delivery operations at a current location, one or more of the light sources may be selected to perform the operations described herein in order to detect and map one or more surfaces within environments. Further, a controller may select one or more light sources for light emission.

The process 500 may continue to select a wavelength of light for each light source, as at 508. For example, each light source may emit the same or different wavelengths of light, such as white light, particular wavelengths of human-visible light, infrared light, and/or other wavelengths or combination of wavelengths of light. In example embodiments utilizing multiple light sources, each of the light sources may emit different wavelengths of light such that light emitted by individual light sources may be differentiated or distinguished from light emitted by other light sources. Moreover, wavelengths of light may be selected based on other factors, such as ambient light, light pollution, time of day, objects, animals, or people in proximity, or other factors. Further, a controller may select a wavelength of light for each light source.

The process 500 may proceed to select a strobing frequency for each light source, as at 510. For example, each light source may emit light at the same or different strobing frequencies, such as approximately 20 times per minute, 40 times per minute, 50 times per minute, 100 times per minute, or other strobing frequencies. In example embodiments utilizing multiple light sources, each of the light sources may emit light at different strobing frequencies or at the same strobing frequency offset or out-of-phase from each other, such that light emitted by individual light sources may be differentiated or distinguished from light emitted by other light sources. Moreover, strobing frequencies of light may be selected based on other factors, such as ambient light, light pollution, time of day, objects, animals, or people in proximity, or other factors. Further, a controller may select a strobing frequency for each light source.

The process 500 may then continue with selecting a structured light pattern for each light source, as at 512. For example, each light source may emit light with the same or different patterns of structured light, such as points or dot matrices, lines or stripes, repeating shapes or markers such as circles, triangles, squares, or other shapes or markers, known patterns or shapes such as images, characters, logos, trademarks, or other known patterns or shapes, and/or other types of patterns of structured light. In example embodiments utilizing multiple light sources, each of the light sources may emit light with different patterns of structured light, such that light emitted by individual light sources may be differentiated or distinguished from light emitted by other light sources. Moreover, patterns of structured light may be selected based on other factors, such as ambient light, light pollution, time of day, objects, animals, or people in proximity, or other factors. Further, a controller may select a structured light pattern for each light source.

The process 500 may proceed with instructing emission of the light by the selected light sources, as at 514. For example, based on the selected wavelengths of light, selected strobing frequencies, and/or selected structured light patterns for individual light sources, the selected light sources may be instructed to emit light toward a surface within the environment. In this manner, the emitted light may be captured by one or more imaging devices and processed to detect and map the surface within the environment. Further, a controller may instruct emission of the light by the selected light sources.

The process 500 may then end, as at 516.

Using the process described herein at least with respect to FIG. 5, one or more light sources associated with or onboard an aerial vehicle may be selected or leveraged to perform operations related to detecting and mapping one or more surfaces within an environment. The selected light sources may emit light with various attributes onto one or more surfaces, such that geometries, dimensions, features, or other aspects of the surfaces may be detected and mapped.

Figure 6:
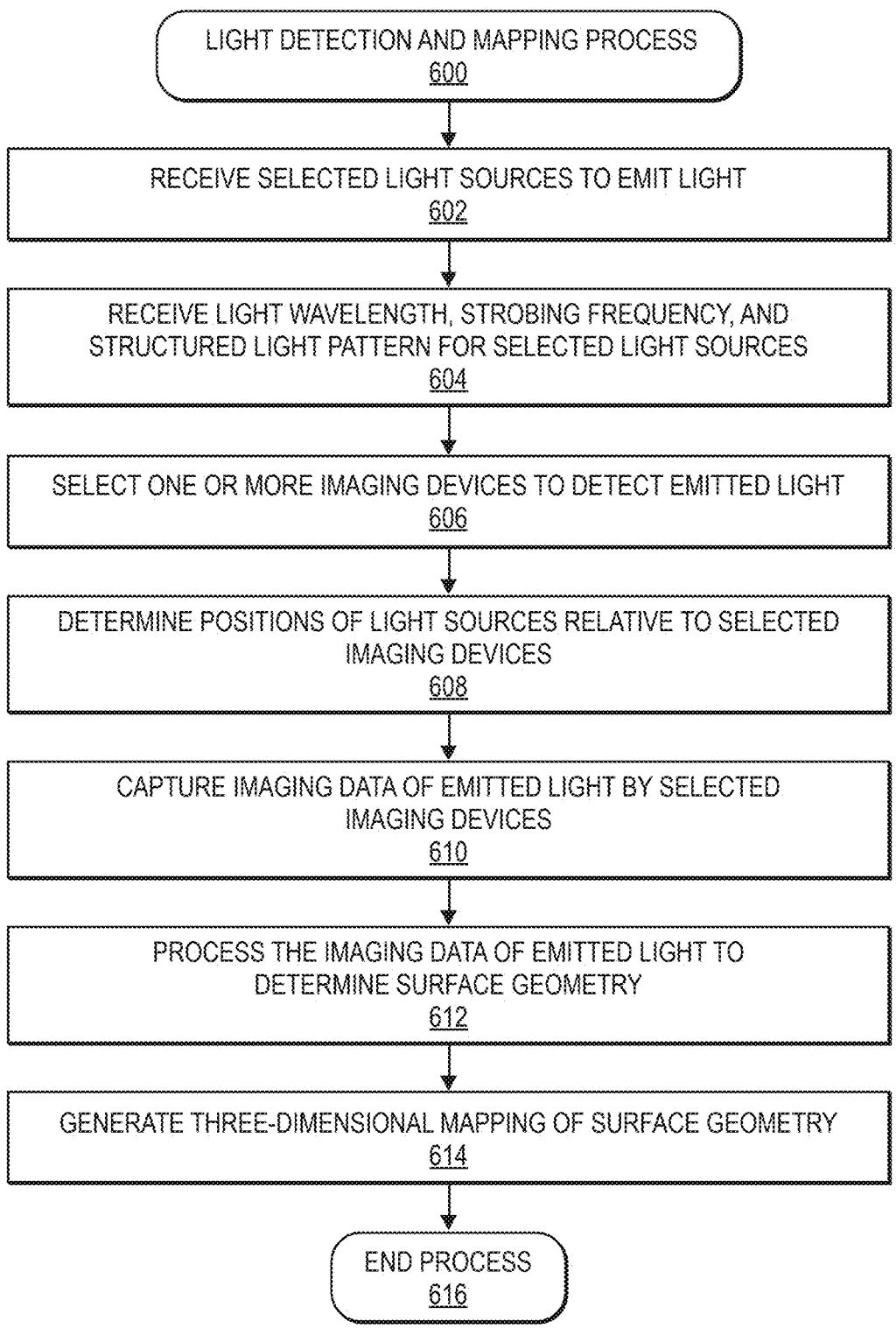
FIG. 6 is a flow diagram illustrating an example light detection and mapping process, in accordance with implementations of the present disclosure.

FIG. 6 is a flow diagram illustrating an example light detection and mapping process 600, in accordance with implementations of the present disclosure.

The process 600 may begin by receiving selected light sources to emit light, as at 602. For example, as described herein at least with respect to FIG. 5, responsive to determining that the aerial vehicle is engaged in landing and/or delivery operations at a current location, one or more of the light sources may have been selected to perform the operations described herein in order to detect and map one or more surfaces within environments. The selected light sources may be associated with and onboard the aerial vehicle, and may further have known positions and/or orientations onboard the aerial vehicle. Further, a controller may receive the selected light sources to emit light.

The process 600 may continue by receiving light wavelength, strobing frequency, and structured light pattern for the selected light sources, as at 604. For example, as described herein at least with respect to FIG. 5, a wavelength of light, a strobing frequency, and/or a pattern of structured light for individual ones of the selected light sources may have been determined to perform the operations described herein in order to detect and map one or more surfaces within environments. Various of the selected light sources may have the same or different selected wavelengths of light, strobing frequencies, and/or patterns of structured light. Further, a controller may receive light wavelength, strobing frequency, and structured light pattern for the selected light sources.

The process 600 may proceed by selecting one or more imaging devices to detect emitted light, as at 606. For example, the various types of imaging devices may include color or RGB cameras, black-and-white cameras, stereovision camera pairs, telephoto cameras, infrared cameras, long-wave infrared cameras, and/or other types of imaging devices or sensors. Based on the positions and/or orientations of the selected light sources, and/or based on the attributes of light emitted by the selected light sources, one or more imaging devices may be selected to capture imaging data of the emitted light upon one or more surfaces within an environment. In some example embodiments, an imaging device may be selected based on a position and/or orientation relative to one or more light sources. In additional example embodiments, an imaging device may be selected based on a wavelength of light, a strobing frequency, and/or a pattern of structured light emitted by one or more light sources. Further, a controller may select one or more imaging devices to detect emitted light.

The process 600 may continue to determine positions of light sources relative to selected imaging devices, as at 608. For example, positions and/or orientations of light sources relative to selected imaging devices may include distances, separations, positions, orientations, angles, and/or other aspects with respect to a global coordinate frame or a local coordinate frame associated with the aerial vehicle. In this manner, a position, orientation, direction, and/or trajectory of emitted light from individual light sources relative to fields of view of individual imaging devices may be determined. Further, a controller may determine positions of light sources relative to selected imaging devices.

The process 600 may proceed to capture imaging data of emitted light by selected imaging devices, as at 610. For example, the one or more selected imaging devices may capture imaging data that includes emitted light from the selected light sources upon one or more surfaces within an environment. In some example embodiments, particular imaging devices, e.g., infrared cameras, may capture imaging data that includes emitted light from particular light sources, e.g., infrared light sources. In other example embodiments, particular imaging devices may be operated or actuated at frequencies that correspond to strobing frequencies of particular light sources. In further example embodiments, particular imaging devices may be configured to capture imaging data that includes emitted light having patterns of structured light from particular light sources. Further, a controller may instruct selected imaging devices to capture imaging data of emitted light.

The process 600 may continue with processing the imaging data of emitted light to determine surface geometry, as at 612. For example, based on the selected light sources and selected attributes of emitted light, and/or based on the selected imaging devices and their positions and/or orientations relative to the light sources, the captured imaging data may be processed to detect and map one or more surfaces within an environment. Various image processing techniques or algorithms may be used to process the imaging data, including structured light imaging data processing techniques or algorithms, and/or other types of imaging data processing techniques or algorithms. Moreover, the image processing may detect or determine geometries, dimensions, features, slopes, formations, irregularities, objects, or other aspects or characteristics associated with one or more surfaces within an environment. Further, a controller may process the imaging data of emitted light to determine surface geometry.

The process 600 may then proceed with generating a three-dimensional mapping of the surface geometry, as at 614. For example, based on the processing of the imaging data to detect or determine geometries, dimensions, features, slopes, formations, irregularities, objects, or other aspects or characteristics associated with one or more surfaces within an environment, one or more models or maps of the one or more surfaces within an environment may be created or generated, e.g., three-dimensional models or maps. Various model or map generation techniques or algorithms may be used to create a model or map of the one or more surfaces, including various feature or surface mapping algorithms, three-dimensional model or map generation algorithms, and/or other types of modeling or mapping techniques or algorithms. Further, a controller may generate a three-dimensional mapping of the surface geometry.

The process 600 may then end, as at 616.

Using the process described herein at least with respect to FIG. 6, one or more imaging devices associated with or onboard an aerial vehicle may be selected or leveraged to perform operations related to detecting and mapping one or more surfaces within an environment. The selected imaging devices may capture imaging data of light emitted with various attributes upon one or more surfaces from selected light sources, and the imaging data may be processed and analyzed to determine geometries, dimensions, features, or other aspects of the surfaces. Then, three-dimensional models or maps of the surfaces may be generated or created, which models or maps may aid various operations of aerial vehicles such as navigation, landing, delivery, takeoff, or other operations.

Figure 7:
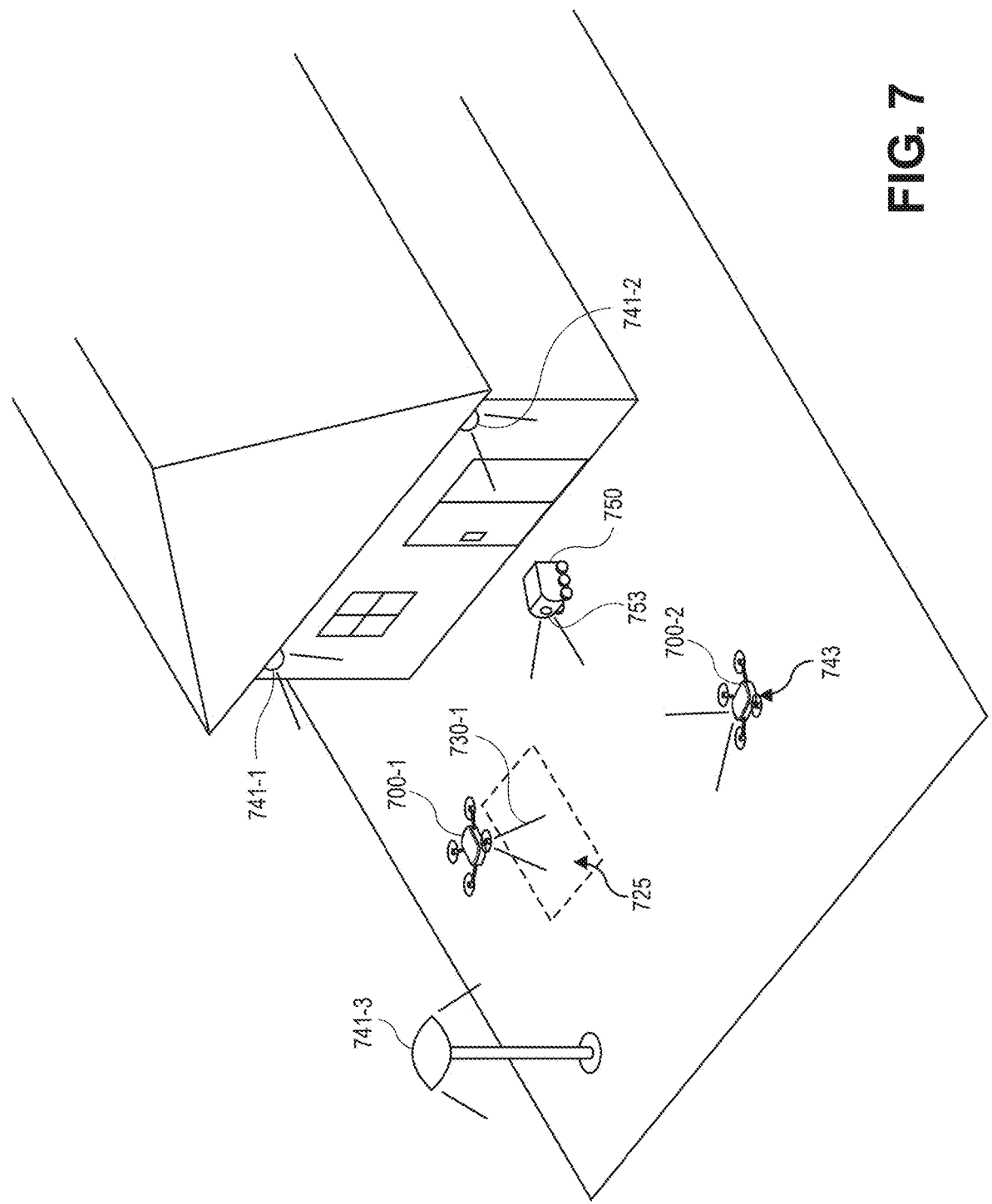
FIG. 7 is a schematic perspective view diagram of an example aerial vehicle including one or more light sources and imaging devices in an example environment having additional light sources, in accordance with implementations of the present disclosure.

FIG. 7 is a schematic perspective view diagram of an example aerial vehicle 700-1 including one or more light sources and imaging devices in an example environment having additional light sources, in accordance with implementations of the present disclosure. The aerial vehicle 700-1, as well as aerial vehicle 700-2, may include any and all of the features of the aerial vehicles 100, 200, 300 discussed above at least with respect to FIGS. 1-3.

As shown in FIG. 7, an example aerial vehicle 700-1 may include one or more light sources that emit light 730-1 with various attributes, and/or one or more imaging devices that capture imaging data of light emitted upon a surface 725 within the example environment. The one or more light sources may emit light 730-1 in a substantially downward direction from the example aerial vehicle 700-1, e.g., when the aerial vehicle is in a VTOL orientation. In addition, the one or more imaging devices may also have respective fields of view that point in a substantially downward direction from the example aerial vehicle 700-1, e.g., when the aerial vehicle is in a VTOL orientation. In the example of FIG. 7, the aerial vehicle 700-1 may be performing a landing and/or delivery operation upon the surface 725, e.g., proximate a customer location, home, building, or other landing or delivery location.

The example environment illustrated in FIG. 7 may include the surface 725, e.g., a ground surface, landing pad, or delivery location, and the surface 725 may include one or more surface geometries, dimensions, features, slopes, formations, irregularities, objects, or other characteristics. In addition, the example environment of FIG. 7 may also include one or more additional light sources, such as outdoor lights 741-1, 741-2 that may be coupled or associated with a home, building, or other structure, and/or fixed or static outdoor lights or lamps 741-3 positioned or located proximate the surface 725. Further, the example environment of FIG. 7 may also include various mobile, movable, rotatable, or directable light sources, such as ground-based vehicles 750 that may include light sources to emit light 753, other aerial vehicles 700-2 that may include light sources to emit light 743, mobile or static connected home devices including smart or connected lights, smart doorbells, smart security systems, voice-controlled smart devices, and/or various other types of smart home devices that may include light sources to emit and/or direct light.

In example embodiments, one or more of the additional light sources proximate the surface 725 within the environment may be selected or leveraged to emit light toward the surface 725 and further aid in the detection and mapping of the surface 725. For example, individuals, customers, or other entities may opt in to allow selection and use of additional light sources that may be associated with customers, delivery locations, entities, homes, buildings, structures, and/or other locations.

In some example embodiments, based on a current location of the aerial vehicle 700-1 and/or a known landing and/or delivery location for the aerial vehicle 700-1, it may be determined whether one or more additional light sources is present and available to emit light proximate the surface 725. Such data or information associated with additional light sources may be stored in a database or memory having associations between additional light sources and individuals, customers, entities, delivery locations, and/or other locations. In other example embodiments, one or more additional light sources proximate the surface 725 may be detected by one or more communication devices or sensors associated with the aerial vehicle 700-1, e.g., using various types of communication techniques such as Bluetooth, WiFi, radiofrequency identification (RFID), or other communication methods or technologies. Further, one or more additional light sources proximate the surface 725 may be detected or determined by various other types of detection or sensing methods or technologies, including visual detection of one or more additional light sources by an imaging device onboard the aerial vehicle 700-1.

Upon detection or determination of one or more additional light sources proximate the surface 725, the aerial vehicle 700-1 may initiate a communication connection with the additional light sources. For example, one or more communication devices or sensors associated with the aerial vehicle 700-1 may initiate communication over satellite, cellular, Internet, or other communication networks that are also connected to one or more additional light sources proximate the surface 725. In addition, one or more communication devices or sensors associated with the aerial vehicle 700-1 may initiate communication directly with one or more additional light sources, e.g., using various types of communication techniques such as Bluetooth, WiFi, or other communication methods or technologies. Various other types of communication connections, techniques, or protocols may be initiated and established between the aerial vehicle 700-1 and one or more additional light sources proximate the surface 725, e.g., either directly or indirectly via various types of communication networks.

Responsive to initiating and establishing communication connections between the aerial vehicle 700-1 and one or more additional light sources proximate the surface 725, one or more attributes, characteristics, and/or capabilities of the additional light sources may be received or determined by the aerial vehicle 700-1. Such attributes may include types of light sources, positions and/or orientations of light sources relative to the surface 725 and/or the aerial vehicle 700-1, capabilities of light sources with respect to available wavelengths of light, strobing frequencies, patterns of structured light, and/or other attributes of light, and/or various other attributes, characteristics, and/or capabilities of the additional light sources.

In addition, various attributes of light to be emitted by the additional light sources may be selected, such as wavelengths of light, strobing frequencies, patterns of structured light, and/or other characteristics as further described herein. Further, the selected additional light sources may be instructed to emit light having various selected attributes of light toward the surface 725 in order to facilitate the various operations of the aerial vehicle 700-1. Then, one or more imaging devices associated with the aerial vehicle 700-1 may capture imaging data of emitted light upon the surface 725. The imaging data may comprise various sets of imaging data associated with different light sources, e.g., a first set of imaging data that captures emitted light from a first additional light source 741-1, a second set of imaging data that captures emitted light from a second additional light source associated with the ground-based vehicle 750, a third set of imaging data that captures emitted light from a third additional light source associated with another aerial vehicle 700-2, etc.

Moreover, the various imaging data captured by one or more imaging devices associated with the aerial vehicle 700-1 may be processed to determine geometries, dimensions, features, slopes, formations, irregularities, objects, or other aspects or characteristics associated with the surface 725 within the environment. Furthermore, a three-dimensional model or map of the surface 725 within the environment may be created or generated based on the determined geometries, dimensions, features, or other characteristics, as further described herein at least with respect to FIG. 6.

By connecting and/or communicating with one or more additional light sources at or proximate a surface within an environment, the additional light sources may be selected, leveraged, and instructed to emit light having various attributes toward the surface. Then, one or more imaging devices associated with an aerial vehicle may capture additional imaging data of emitted light from the additional light sources upon the surface to further aid the detection and mapping of the surface. Further, geometries, dimensions, features, or other characteristics associated with the surface may be determined based on processing of the additional imaging data, and a three-dimensional model or map of the surface may be generated or created, which may be utilized to facilitate safe and reliable navigation, landing, delivery, takeoff, or other operations by an aerial vehicle within the environment.

Figure 8:
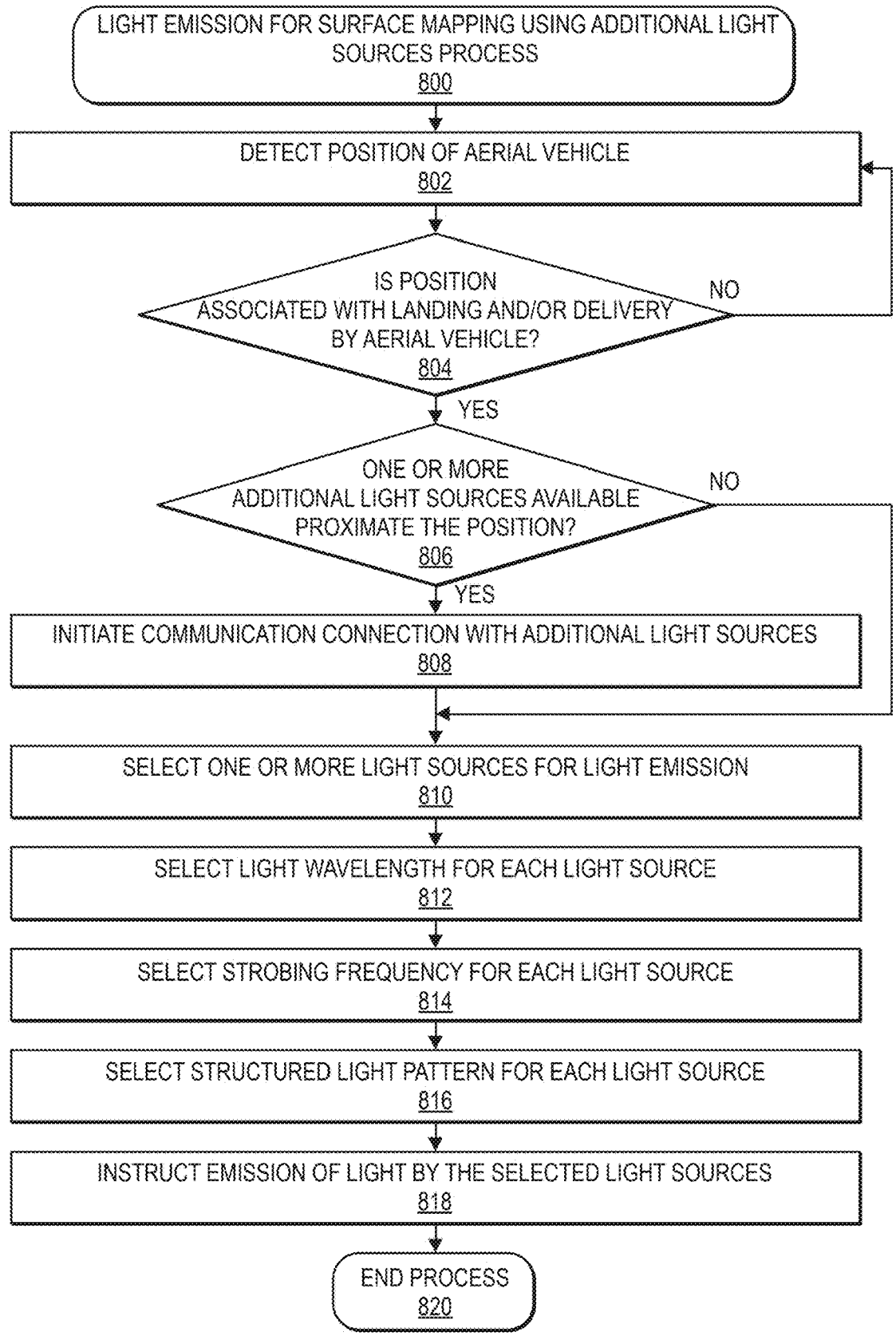
FIG. 8 is a flow diagram illustrating an example light emission for surface mapping using additional light sources process, in accordance with implementations of the present disclosure.

FIG. 8 is a flow diagram illustrating an example light emission for surface mapping using additional light sources process 800, in accordance with implementations of the present disclosure.

The process 800 may begin by detecting a position of an aerial vehicle, as at 802. For example, one or more global positioning sensors (GPS), navigation sensors, inertial measurement units, accelerometers, gyroscopes, or other positioning sensors associated with an aerial vehicle may detect a position and/or orientation of the aerial vehicle. It may be determined whether the aerial vehicle is at or proximate a landing or takeoff location, delivery location, relay location, or other location at which one or more surfaces may be detected and mapped to facilitate aerial vehicle operations. In addition, it may be determined whether the aerial vehicle is configured or oriented for vertical flight operations or in a VTOL orientation, and/or configured or oriented for horizontal flight operations or in a horizontal flight orientation. Further, a controller may detect a position of the aerial vehicle.

The process 800 may continue by determining whether the position is associated with a landing and/or delivery by the aerial vehicle, as at 804. For example, based on data from one or more sensors associated with the aerial vehicle, and/or based on a determination that the aerial vehicle is configured or oriented for vertical flight operations or in a VTOL orientation, it may be determined that the aerial vehicle is engaged in landing and/or delivery operations at a current location. In addition, the aerial vehicle may be engaged in other types of operations, such as takeoff, surveying, search and rescue, or other operations, during which one or more surfaces within the environment may be detected and mapped. Further, a controller may determine whether the position is associated with landing and/or delivery by the aerial vehicle.

If it is determined that the position of the aerial vehicle is not associated with landing, delivery, or other operations associated with detecting and mapping a surface within an environment, the process 800 may return to step 802 and continue to detect a position of the aerial vehicle during performance of various other operations.

If, however, it is determined that the position of the aerial vehicle is associated with landing, delivery, or other operations associated with detecting and mapping a surface within an environment, the process 800 may proceed by determining whether one or more additional light sources is available proximate the position, as at 806. For example, based on data associated with the position, and/or based on detection of one or more additional light sources using various communication techniques, protocols, or networks, it may be determined whether any additional light sources are present and available at or proximate the position of the aerial vehicle, such that one or more of the additional light sources may be selected or leveraged to aid in the detection and mapping of surfaces within the environment. As described herein, the additional light sources may comprise static or fixed light sources such as outdoor lights or lamps, mobile, movable, rotatable, or directable light sources such as ground-based vehicles, other aerial vehicles, and/or various smart or connected lights, cameras, or other devices, and/or various other types of additional light sources. Further, a controller may determine whether one or more additional light sources is available proximate the position.

If it is determined that one or more additional light sources is available, the process 800 may continue to initiate a communication connection with one or more additional light sources, as at 808. For example, using various communication techniques, protocols, or networks, an aerial vehicle may initiate and establish a communication connection with the additional light sources. The communication connection may include communication over one or more satellite, cellular, Internet, or other communication networks, or the communication connection may be a direct link between the aerial vehicle and the additional light sources, e.g., Bluetooth, WiFi, or other direct connection. In addition, based on the communication connection, the aerial vehicle may receive data or information associated with attributes, characteristics, and/or capabilities of the additional light sources, which may include types of light sources, positions and/or orientations of light sources relative to the aerial vehicle, and/or capabilities of light sources with respect to various attributes of emitted light. Further, a controller may initiate the communication connection between the aerial vehicle and one or more additional light sources.

Responsive to initiating and establishing communication connections with one or more additional light sources, and/or if it is determined that no additional light sources are available at or proximate the position, the process 800 may proceed to select one or more light sources for light emission, as at 810. For example, the aerial vehicle may include various types of light sources, including light sources to aid visibility in desired directions, light sources for identification, anti-collision light sources, strobing lights, beacon lights, position lights, or other types of external aerial vehicle light sources for safety, visibility, navigation, landing, takeoff, and/or other purposes. In addition, the various light sources may comprise light emitting diodes (LEDs), light bulbs, infrared light emitters, laser projectors, digital light processing (DLP) projectors, and/or other types of light sources. In some example embodiments, one or more light sources may perform various functions or operations during horizontal flight operations, such as anti-collision lighting, position lighting, or other safety or navigation purposes. Responsive to determining that the aerial vehicle is engaged in landing and/or delivery operations at a current location, one or more of the light sources may be selected to perform the operations described herein in order to detect and map one or more surfaces within environments. In addition, if one or more additional light sources is available and in communication with the aerial vehicle, one or more of the additional light sources may also be selected to perform the operations described herein in order to detect and map one or more surfaces within environments. Further, a controller may select one or more light sources and/or additional light sources for light emission.

The process 800 may continue to select a wavelength of light for each light source, as at 812. For example, each light source may emit the same or different wavelengths of light, such as white light, particular wavelengths of human-visible light, infrared light, and/or other wavelengths or combination of wavelengths of light. In example embodiments utilizing multiple light sources, each of the light sources may emit different wavelengths of light such that light emitted by individual light sources may be differentiated or distinguished from light emitted by other light sources. Moreover, wavelengths of light may be selected based on other factors, such as ambient light, light pollution, time of day, objects, animals, or people in proximity, or other factors. Further, a controller may select a wavelength of light for each light source and/or each additional light source.

The process 800 may proceed to select a strobing frequency for each light source, as at 814. For example, each light source may emit light at the same or different strobing frequencies, such as approximately 20 times per minute, 40 times per minute, 50 times per minute, 100 times per minute, or other strobing frequencies. In example embodiments utilizing multiple light sources, each of the light sources may emit light at different strobing frequencies or at the same strobing frequency offset or out of phase from each other, such that light emitted by individual light sources may be differentiated or distinguished from light emitted by other light sources. Moreover, strobing frequencies of light may be selected based on other factors, such as ambient light, light pollution, time of day, objects, animals, or people in proximity, or other factors. Further, a controller may select a strobing frequency for each light source and/or each additional light source.

The process 800 may then continue with selecting a structured light pattern for each light source, as at 816. For example, each light source may emit light with the same or different patterns of structured light, such as points or dot matrices, lines or stripes, repeating shapes or markers such as circles, triangles, squares, or other shapes or markers, known patterns or shapes such as images, characters, logos, trademarks, or other known patterns or shapes, and/or other types of patterns of structured light. In example embodiments utilizing multiple light sources, each of the light sources may emit light with different patterns of structured light, such that light emitted by individual light sources may be differentiated or distinguished from light emitted by other light sources. Moreover, patterns of structured light may be selected based on other factors, such as ambient light, light pollution, time of day, objects, animals, or people in proximity, or other factors. Further, a controller may select a structured light pattern for each light source and/or each additional light source.

The process 800 may proceed with instructing emission of the light by the selected light sources, as at 818. For example, based on the selected wavelengths of light, selected strobing frequencies, and/or selected structured light patterns for individual light sources, the selected light sources may be instructed to emit light toward a surface within the environment. In this manner, the emitted light may be captured by one or more imaging devices and processed to detect and map the surface within the environment. Further, a controller may instruct emission of the light by the selected light sources and/or additional light sources.

The process 800 may then end, as at 820.

Using the process described herein at least with respect to FIG. 8, one or more light sources associated with or onboard an aerial vehicle and/or one or more additional light sources proximate a position of the aerial vehicle may be selected or leveraged to perform operations related to detecting and mapping one or more surfaces within an environment. The selected light sources and/or additional light sources may emit light with various attributes onto one or more surfaces, such that geometries, dimensions, features, or other aspects of the surfaces may be detected and mapped. Because the additional light sources may be positioned and/or oriented at greater distances, separation, angles, and/or other aspects from an imaging device of the aerial vehicle as compared to light sources onboard the aerial vehicle, the imaging data that is captured and includes the emitted light from such additional light sources may be processed to provide additional data and information with respect to geometries, dimensions, features, or other aspects of the surfaces, thereby facilitating the generation and creation of more accurate and reliable models or maps of such surfaces within environments.

Although the example embodiments described herein describe detection and mapping of surfaces within environments generally in the context of landing and/or delivery operations of aerial vehicles, the detection and mapping of surfaces using the systems and methods described herein may also be used for various other purposes or operations. For example, the models or maps of surfaces within environments may be used to aid object or obstacle avoidance by aerial vehicles, ground-based vehicles, or other types of vehicles, machinery, equipment, or systems. In addition, the models or maps of surfaces within environments may be used to aid in light source and/or imaging device calibration, e.g., by utilizing known light sources and/or imaging devices that are directed toward known locations, targets, markers, features, or other surfaces. Other example embodiments may utilize the models or maps of surfaces within environments for various other purposes or operations.

Figure 9:
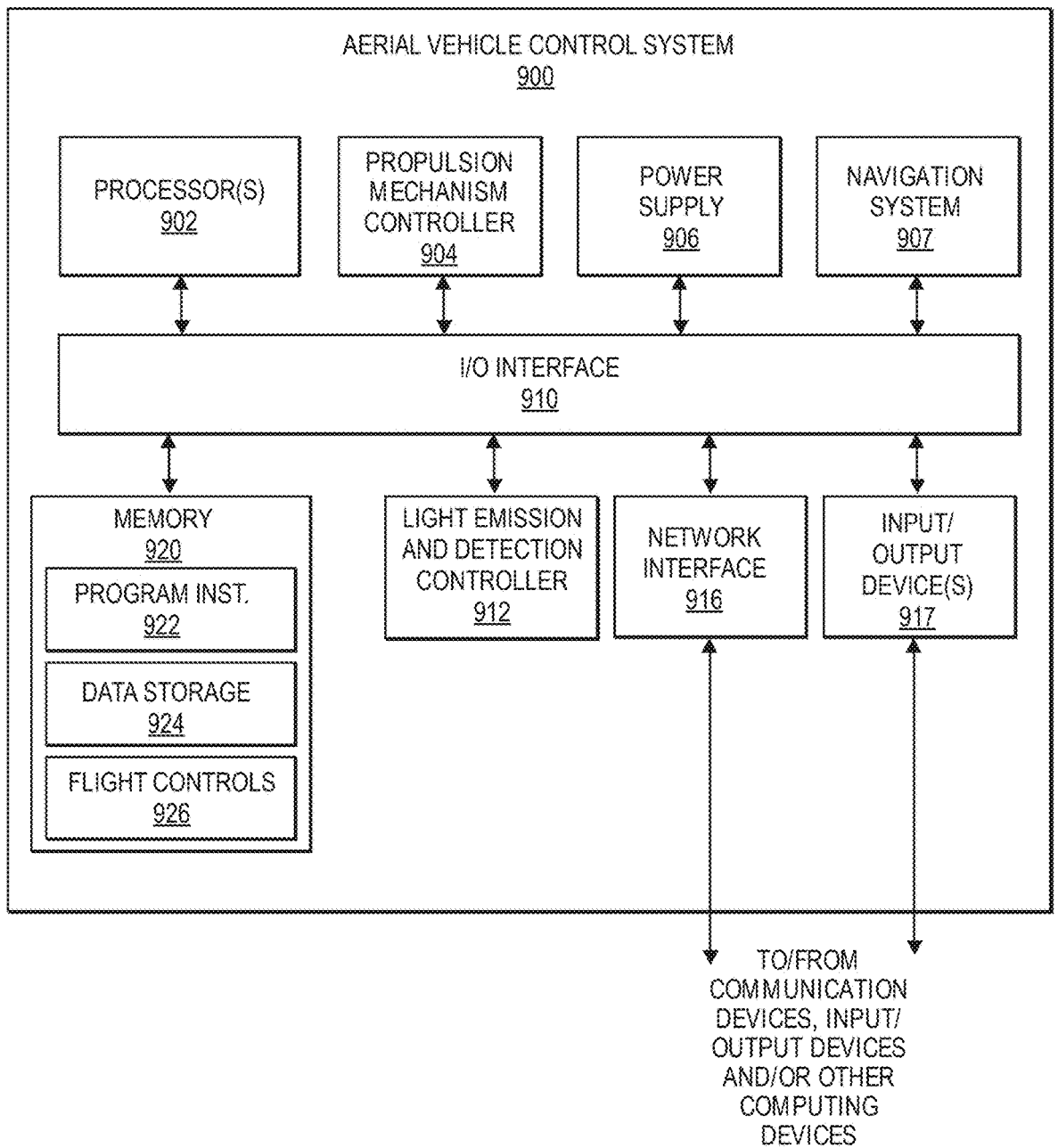
FIG. 9 is a block diagram illustrating various components of an example aerial vehicle control system, in accordance with implementations of the present disclosure.

FIG. 9 is a block diagram illustrating various components of an example aerial vehicle control system 900, in accordance with implementations of the present disclosure.

In various examples, the block diagram may be illustrative of one or more aspects of the aerial vehicle control system 900 that may be used to implement the various systems and processes discussed above. In the illustrated implementation, the aerial vehicle control system 900 includes one or more processors 902, coupled to a non-transitory computer-readable storage medium 920 via an input/output (I/O) interface 910. The aerial vehicle control system 900 may also include a propulsion controller 904, a power supply or battery 906, and/or a navigation system 907. The aerial vehicle control system 900 may further include a light emission and detection controller 912, a network interface 916, and one or more input/output devices 917.

In various implementations, the aerial vehicle control system 900 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer-readable storage medium 920 may be configured to store executable instructions, data, and environment mapping data and/or characteristics, including aerial vehicle data, light source data, imaging device data, imaging data, surface data, environment data, model or map data, and/or other data items accessible by the processor(s) 902. In various implementations, the non-transitory computer readable storage medium 920 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 920 as program instructions 922, data storage 924, and flight controls 926, respectively. In other implementations, program instructions, data, and/or flight controls may be received, sent or stored upon different types of computer-accessible media, such as non-transitory media, or on similar media separate from the non-transitory computer readable storage medium 920 or the aerial vehicle control system 900.

Generally, a non-transitory, computer-readable storage medium may include storage media or memory media such as magnetic or optical media, e.g., disk or CD/DVD-ROM, coupled to the aerial vehicle control system 900 via the I/O interface 910. Program instructions and data stored via a non-transitory computer-readable medium may be transmitted by transmission media or signals, such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface 916 or other peripheral interfaces, such as input/output devices 917. In some implementations, the I/O interface 910 may perform any necessary protocol, timing or other data transformations to convert data signals from one component (e.g., non-transitory computer-readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 900.

The propulsion mechanism controller 904 communicates with the navigation system 907 and adjusts the operational characteristics of each propulsion mechanism to guide the aerial vehicle along a determined path and/or to perform other navigational maneuvers. The navigation system 907 may include a GPS, inertial measurement unit, accelerometer, gyroscope, or other similar devices or systems than can be used to navigate the aerial vehicle to and/or from a location. In addition, the power supply 906 may provide power to various components of the aerial vehicle control system 900, including the propulsion mechanism controller 904, navigation system 907, light emission and detection controller 912, light sources, imaging devices, and/or various other components described herein.

The aerial vehicle control system 900 may also include a light emission and detection controller 912 that communicates with the processor(s) 902, the non-transitory computer-readable storage medium 920, one or more light sources, one or more imaging devices, and/or other components or systems described herein to cause emission of light having various attributes from one or more light sources, capture imaging data of emitted light upon surfaces using one or more imaging devices, and process and analyze the imaging data to determine surface geometry and/or generate models or maps of surfaces within environments, as well as various other functions, operations, or processes described herein.

The network interface 916 may be configured to allow data to be exchanged between the aerial vehicle control system 900, other devices attached to a network, such as other computer systems, control systems of other vehicles, light sources, external or additional light sources, imaging devices, communication devices, systems, or networks, smart or connected devices or systems, and/or other controllers or control systems. For example, the network interface 916 may enable wireless communication between numerous aerial vehicles. In various implementations, the network interface 916 may support communication via wireless general data networks, such as a Wi-Fi network. For example, the network interface 916 may support communication via telecommunications networks such as cellular communication networks, satellite networks, and the like.

Input/output devices 917 may, in some implementations, include one or more displays, monitors, imaging sensors, image capture devices, thermal sensors, infrared sensors, other visual input/output devices, microphones, speakers, other audio input/output devices, time of flight sensors, GPS sensors, inertial measurement units, accelerometers, gyroscopes, other location sensors, pressure sensors, weather sensors, various other sensors described herein, etc. Multiple input/output devices 917 may be present and controlled by the aerial vehicle control system 900. One or more of these sensors may be utilized to assist in performing the various functions, operations, and processes described herein.

As shown in FIG. 9, the memory may include program instructions 922 which may be configured to implement the example processes and/or sub-processes described above. For example, the program instructions 922 may include aerial vehicle controllers, applications, or programs, propulsion mechanism controllers, applications, or programs, light source controllers, applications, or programs, imaging device controllers, applications, or programs, imaging data processing applications, programs, or algorithms, structured light processing applications, programs, or algorithms, three-dimensional modeling or mapping applications, programs, or algorithms, communication connection controllers, applications, or programs, and/or various other controllers, applications, programs, and/or algorithms. The data storage 924 may include various data stores for maintaining data items that may be provided for performing the various functions, operations, and processes described herein. For example, the data storage 924 may include environment mapping data and/or characteristics, including aerial vehicle data, light source data, imaging device data, imaging data, surface data, environment data, model or map data, and/or other data items.

Those skilled in the art will appreciate that the aerial vehicle control system 900 is merely illustrative and is not intended to limit the scope of the present disclosure. In particular, the computing system and devices may include any combination of hardware or software that can perform the indicated functions, including other control systems or controllers, computers, network devices, internet appliances, PDAs, wireless phones, pagers, etc. The aerial vehicle control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

While the above examples have been described with respect to aerial vehicles, the disclosed implementations may also be used for other forms of vehicles, including, but not limited to, ground-based vehicles and water-based vehicles.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5, 6, and 8, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An aerial vehicle, comprising:
   a body;
   a plurality of propulsion mechanisms;
   a plurality of external aerial vehicle light sources, wherein during horizontal flight operations, the plurality of external aerial vehicle light sources emit anti-collision light at desired strobing frequencies;
   a plurality of imaging devices; and
   a controller configured to at least:
      determine that the aerial vehicle is in vertical flight operations; and in response to determining that the aerial vehicle is in vertical flight operations:
  instruct a first external aerial vehicle light source of the plurality of external aerial vehicle light sources to emit first structured light toward a ground surface;
  instruct a second external aerial vehicle light source of the plurality of external aerial vehicle light sources to emit second structured light toward the ground surface, the first and second external aerial vehicle light sources being spaced apart from each other;
  instruct an imaging device of the plurality of imaging devices to capture imaging data of the first and second structured light emitted by the first and second external aerial vehicle light sources upon the ground surface; and
  process the imaging data of the first and second structured light to determine a surface geometry of the ground surface;
  wherein the first structured light and the second structured light include at least one of different wavelengths of structured light, different strobing frequencies, or different patterns of structured light.

2. The aerial vehicle of claim 1, wherein the controller is further configured to:
  determine that the aerial vehicle is in horizontal flight operations; and
  in response to determining that the aerial vehicle is in horizontal flight operations:
    instruct the first and second external aerial vehicle light sources to emit the anti-collision light at the desired strobing frequencies for navigation.

3. The aerial vehicle of claim 1, wherein the imaging device and the first and second external aerial vehicle light sources are associated with the body of the aerial vehicle; and
  wherein the first and second external aerial vehicle light sources are positioned on opposite sides of the imaging device.

4. The aerial vehicle of claim 1, wherein the different patterns of structured light comprise at least one of points, lines, repeating shapes, or a defined shape.

5. A method, comprising:
  determining that an aerial vehicle is engaged in vertical flight operations to deliver an item upon a surface, the aerial vehicle including a plurality of anti-collision light sources onboard the aerial vehicle, wherein during horizontal flight operations, the plurality of anti-collision light sources emit anti-collision light at desired strobing frequencies; and
  in response to determining that the aerial vehicle is engaged in vertical flight operations:
    selecting, by a controller, a light source of the plurality of anti-collision light sources onboard the aerial vehicle;
    selecting, by the controller, at least one attribute of structured light to be emitted by the light source;
    instructing, by the controller, the light source to emit the structured light having the at least one attribute toward the surface;
    receiving, by the controller from an imaging device onboard the aerial vehicle, imaging data of the structured light upon the surface; and
    processing, by the controller, the imaging data of the structured light to determine a surface geometry of the surface.

6. The method of claim 5, wherein selecting the at least one attribute of the structured light to be emitted by the light source further comprises:
  selecting a wavelength of the structured light to be emitted by the light source; and
  wherein the wavelength of the structured light includes at least one of infrared light or human-visible light.

7. The method of claim 5, wherein the imaging device comprises at least one of an infrared camera, a color camera, or a black-and-white camera.

8. The method of claim 6, wherein the wavelength of the structured light is further selected based on at least one of a time of day, ambient light, or light pollution in an environment around the aerial vehicle.

9. The method of claim 5, wherein selecting the at least one attribute of the structured light to be emitted by the light source further comprises:
  selecting a strobing frequency for the structured light to be emitted by the light source.

10. The method of claim 5, wherein selecting the at least one attribute of the structured light to be emitted by the light source further comprises:
  selecting a pattern of the structured light to be emitted by the light source; and
  wherein the pattern of the structured light includes at least one of points, lines, repeating shapes, or a defined shape.

11. The method of claim 5, wherein selecting the light source further comprises:
  selecting at least two light sources from the plurality of anti-collision light sources onboard the aerial vehicle; and
  wherein the at least two light sources are spaced apart from each other and at known positions relative to the imaging device.

12. The method of claim 11, wherein selecting the at least one attribute of the structured light further comprises:
  selecting a first attribute for a first light source of the at least two light sources; and
  selecting a second attribute for a second light source of the at least two light sources;
  wherein the first and second attributes are different from each other.

13. The method of claim 12, wherein the first and second attributes include at least one of different wavelengths of the structured light, different strobing frequencies, or different patterns of the structured light.

14. The method of claim 5, further comprising:
  determining, by the controller, an additional light source in an environment around the aerial vehicle;
  initiating, by the controller, a communication connection with the additional light source;
  selecting, by the controller, at least one attribute of light to be emitted by the additional light source; and
  instructing, by the controller, the additional light source to emit light having the at least one attribute toward the surface;
  wherein the imaging data received by the controller from the imaging device onboard the aerial vehicle further comprises additional imaging data of the emitted light from the additional light source upon the surface; and
  wherein the surface geometry of the surface is further determined based on processing of the additional imaging data.

15. An aerial vehicle, comprising:
a light source that comprises one of a plurality of anti-collision light sources onboard the aerial vehicle, wherein during horizontal flight operations, the plurality of anti-collision light sources emit anti-collision light at desired strobing frequencies;
an imaging device; and
a controller configured to at least:
determine that the aerial vehicle is engaged in vertical flight operations to deliver an item upon a surface; and
in response to determining that the aerial vehicle is engaged in vertical flight operations:
select at least one attribute of structured light to be emitted by the light source toward the surface;
instruct the light source to emit the structured light having the at least one attribute toward the surface;
receive, from the imaging device, imaging data of the structured light upon the surface; and
process the imaging data of the structured light to determine a surface geometry of the surface.

16. The aerial vehicle of claim 15, wherein the at least one attribute of the structured light comprises a pattern of the structured light including at least one of points, lines, repeating shapes, or a defined shape.

17. The aerial vehicle of claim 15, wherein the controller is further configured to at least:
select at least two light sources of the plurality of anti-collision light sources to emit the structured light toward the surface;
wherein selecting the at least one attribute of the structured light further comprises selecting respective attributes of the structured light for respective ones of the at least two light sources; and
wherein the respective attributes of the structured light include at least one of different wavelengths of the structured light, different strobing frequencies, or different patterns of the structured light for respective ones of the at least two light sources.

18. The method of claim 5, wherein the plurality of anti-collision light sources onboard the aerial vehicle are further configured, during horizontal flight operations, to at least one of rotate, spin, or move while emitting the anti-collision light at desired strobing frequencies.

19. The method of claim 5, wherein instructing the light source to emit the structured light having the at least one attribute toward the surface further comprises:
instructing the light source to rotate or move to a position or orientation to emit the structured light toward the surface.

20. The method of claim 19, wherein the surface comprises a ground surface; and
wherein, when the aerial vehicle is engaged in vertical flight operations, the light source is instructed to rotate or move to a position or orientation to emit the structured light in a downward direction toward the ground surface.

* * * * *